(12) United States Patent
Person et al.

(10) Patent No.: US 11,113,589 B2
(45) Date of Patent: Sep. 7, 2021

(54) SYSTEM AND METHOD FOR PRINTING CUSTOMIZED ITEMS

(71) Applicant: CCL LABEL, INC., Framingham, MA (US)

(72) Inventors: Wade Person, Huntington Beach, CA (US); Alan Porter, Huntington Beach, CA (US); Brad Nelson, Santa Rosa, CA (US); Phillip McGee, Chino Hills, CA (US)

(73) Assignee: CCL LABEL, INC., Framingham, MA (US)

(*) Notice: Subject to any disclaimer, the term of this patent is extended or adjusted under 35 U.S.C. 154(b) by 0 days.

(21) Appl. No.: 16/793,392

(22) Filed: Feb. 18, 2020

(65) Prior Publication Data
US 2020/0184288 A1    Jun. 11, 2020

Related U.S. Application Data

(63) Continuation of application No. 15/512,095, filed as application No. PCT/US2015/051155 on Sep. 21, 2015, now Pat. No. 10,599,963.
(Continued)

(51) Int. Cl.
*G06F 3/12*   (2006.01)
*G06K 15/02*   (2006.01)
(Continued)

(52) U.S. Cl.
CPC ....... *G06K 15/1868* (2013.01); *G06F 3/1206* (2013.01); *G06F 3/1247* (2013.01);
(Continued)

(58) Field of Classification Search
CPC .......................... G06K 15/1868; G06F 3/1206
See application file for complete search history.

(56) References Cited

U.S. PATENT DOCUMENTS

| | | | | |
|---|---|---|---|---|
| 4,839,829 A | * | 6/1989 | Freedman | ............... G06F 40/12 |
| | | | | 715/751 |
| 4,948,445 A | ‡ | 8/1990 | Hees | .................. B29D 99/0089 |
| | | | | 156/196 |

(Continued)

FOREIGN PATENT DOCUMENTS

| | | |
|---|---|---|
| WO | 200166349 A1 | 9/2001 |
| WO | WO-200166349 A1 ‡ | 9/2001 |

OTHER PUBLICATIONS

Patent Cooperation Treaty (PCT), International Search Report and Written Opinion for Application PCT/US2015/051155 filed Sep. 21, 2015, dated Dec. 29, 2015. International Searching Authority, US.‡

*Primary Examiner* — Ibrahim Siddo
(74) *Attorney, Agent, or Firm* — McDonald Hopkins LLC

(57) ABSTRACT

A printing system and method of printing are provided herein. The printing system may generate custom user designs for printing. The designs may be associated with a selected print medium. The print medium may have a particular layout. The printing system may convert the design for printing on other print media without requiring user alteration or input of the design. In another aspect, the printing system may facilitate printing the designs via local printers and/or via professional printers. Accordingly, printing of designs on different print-receptive media items can be accomplished.

14 Claims, 14 Drawing Sheets

Related U.S. Application Data

(60) Provisional application No. 62/052,850, filed on Sep. 19, 2014.

(51) Int. Cl.
*G06F 40/12* (2020.01)
*G06F 40/103* (2020.01)
*G06F 40/186* (2020.01)

(52) U.S. Cl.
CPC .......... *G06F 3/1257* (2013.01); *G06F 3/1285* (2013.01); *G06F 40/103* (2020.01); *G06F 40/12* (2020.01); *G06F 40/186* (2020.01); *G06K 15/024* (2013.01); *G06K 15/181* (2013.01); *G06K 15/1885* (2013.01); *G06K 2215/0097* (2013.01)

(56) References Cited

U.S. PATENT DOCUMENTS

| | | | | |
|---|---|---|---|---|
| 5,389,414 A * | 2/1995 | Popat | ............... | G09F 3/02 283/101 |
| 6,505,858 B1 * | 1/2003 | Kirchmeyer | ............ | A47G 1/14 281/2 |
| 6,826,727 B1 * | 11/2004 | Mohr | ............... | G06F 40/103 715/235 |
| 8,151,197 B1 ‡ | 4/2012 | Sulak | ............... | G06F 40/186 715/74 |
| 8,810,838 B2 ‡ | 8/2014 | Miyata | ............ | H04N 1/00244 358/1.1 |
| 9,844,914 B2 ‡ | 12/2017 | Pettis | ............ | B29C 64/386 |
| 2003/0169451 A1 * | 9/2003 | Ponce | ............ | G06F 40/174 358/1.18 |
| 2007/0162841 A1 * | 7/2007 | Bailey | ............ | G07F 17/42 715/234 |
| 2009/0310167 A1 * | 12/2009 | Sugimoto | ......... | G06F 3/1208 358/1.15 |
| 2010/0021673 A1 ‡ | 1/2010 | Komorous-Towey | | B32B 5/026 428/43 |
| 2012/0225246 A1 ‡ | 9/2012 | Wang | ............ | B41M 5/52 428/14 |
| 2013/0329258 A1 * | 12/2013 | Pettis | ............ | F16M 11/18 358/1.15 |
| 2014/0106132 A1 ‡ | 4/2014 | Hong | ............ | B41M 5/00 428/17 |

\* cited by examiner
‡ imported from a related application

SYSTEM AND METHOD FOR PRINTING CUSTOMIZED ITEMS

CROSS-REFERENCE TO RELATED APPLICATION

This application is a continuation of U.S. patent application Ser. No. 15/512,095 filed on Mar. 17, 2017, entitled "SYSTEM AND METHOD FOR PRINTING CUSTOMIZED ITEMS," which claims the benefit of International Application No. PCT/US2015/051155 filed on Sep. 21, 2015, entitled "SYSTEM AND METHOD FOR PRINTING CUSTOMIZED ITEMS," which claims priority to and the benefit of U.S. Provisional Patent Application Ser. No. 62/052,850, filed Sep. 19, 2014, and entitled "SYSTEM AND METHOD FOR PRINTING CUSTOMIZED AND/OR PERSONALIZED ITEMS," the entireties of which are incorporated herein by reference.

FIELD OF USE

The present disclosure relates to systems and methods for printing customized items, and, more particularly, to automatically converting a source design or template for printing via different printer types (e.g., professional printer or local printer) onto different print-receptive media.

BACKGROUND

Network-based custom-printing systems allow a user to access software stored on a server, design a document or other item while connected to the server, and then print the document or item after the design has been completed. Traditional systems either print using a local printer or allow for ordering of professional prints (e.g., digital press fulfillment). If an end user wishes to print a project they have already created locally, they have to re-create that project in a separate tool focused on digital press printing. Alternatively, if an end user wishes to print a project they have created for a digital press printing, e.g., a professional printer; the user re-creates the project in a separate tool dedicated to local printing. These systems do not provide sufficient efficiency.

Professional printers have different capabilities and features from local printers and printing on these require very different processes. For example, paper used in such printing devices is often very different; e.g., a local printer may utilize a single 8½ in.×11 in. single sheet whereas the professional printer may utilize a roll or ream of paper or larger sized sheets of paper. Further, the overall area over which these printers can print may be very different. For example, professional printers can print much larger items. Further still, the printers may utilize different inks and color ranges, which may affect the available media on which items are printed or may affect the use of the end product printed. Still further, the print area on the printing medium may vary depending upon the printer being utilized.

These differences may make printing a design on different media (or via different printers) inefficient and difficult. In such situations, a user may be required to start from scratch for different printing processes. Therefore, there is a need for a system and method that more efficiently and/or effectively print designs.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

A printing system, apparatus, and/or method having various innovative features is provided herein. The printer system may include a processor coupled to a memory, the memory storing computer-executable instructions. The processor may execute or facilitate execution of the computer-executable instructions to perform operations and/or computer executable components. In an example, the printing system may generate a customized design from user input, identify a print-receptive medium for receiving the customized design, and may convert, based on the print-receptive medium, the customized design from a first format to a second format.

A method for customizing a printing operation is disclosed herein. The method may include receiving, by a system including a processor, data associated with user input for a design project. The method may generate a first printable file comprising the design and associated with a determined print medium. In an aspect, the method may identify a target print medium selected for having the design printed thereon and may determine whether to reformat the design based on the target print medium and the determined print medium. In another aspect, the method may, in response to determining that the design should be reformatted, reformat the customized design for printing onto the target print medium.

Further, a printing system is described herein. The printer system may identify a user-generated design arranged in a first template associated with a first type of print-receptive medium. The system may initiate, based on user input, printing of the design to a second type of print-receptive medium based on a second template, wherein the first template and the second template comprise different parameters. The system may also automatically allow the user to generate a design according to the second template.

The following description and the drawings disclose various illustrative aspects. Some improvements and novel aspects may be expressly identified, while others may be apparent from the description and drawings.

BRIEF DESCRIPTION OF THE DRAWINGS

The present teachings may be better understood by reference to the following detailed description taken in connection with the following illustrations, wherein.

DETAILED DESCRIPTION

Figure 1:
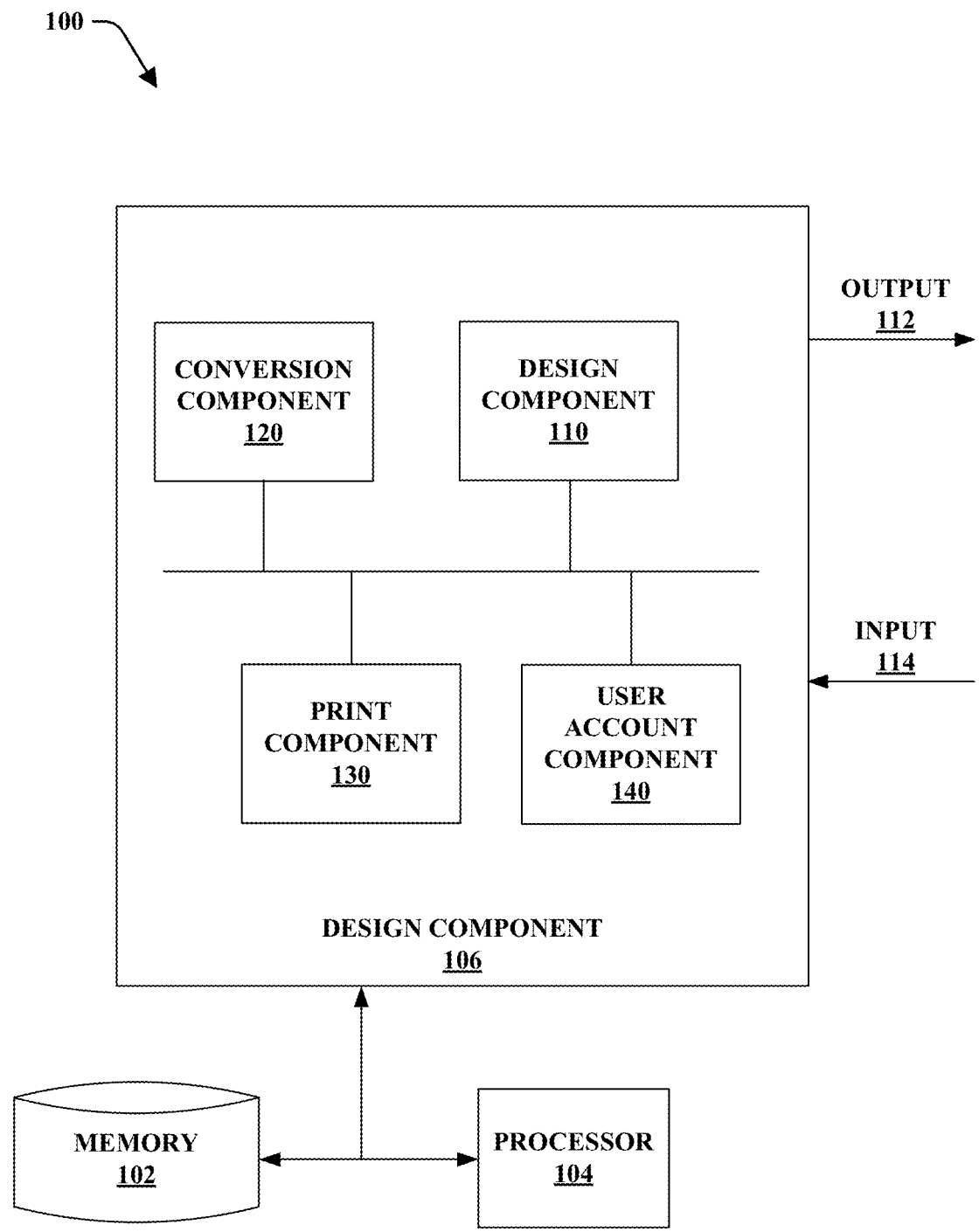
FIG. 1 is a functional block diagram of a printing system, in accordance with various described embodiments.

In the following description of the present teachings, reference is made to the accompanying drawings which form a part thereof, and in which is shown, by way of illustration, exemplary embodiments illustrating the principles of the present teachings and how it may be practiced. It is noted that other embodiments may be utilized to practice the present teachings and structural and functional changes may be made thereto without departing from the scope of the present teachings. For example, the various embodiments may be combined such that features of one may replace corresponding features of another to create a further embodiment. However, for the sake of brevity, not every single combination has been described.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Moreover, terms such as "access point," "server," and the likes, are utilized interchangeably, and refer to a network component or appliance that serves and receives control data, voice, video, sound, image, text (e.g., including chat room or help desk text, etc.) or other data-stream or signaling-stream. Data and signaling streams may be packetized or frame-based flows. Furthermore, the terms "user," "customer," "consumer," and the like are employed interchangeably throughout the subject specification, unless context suggests otherwise or warrants a particular distinction among the terms. In examples, a "user" may generally refer to an end user. In another aspect, terms such as "operator," "administrator," "provider" and the like are employed interchangeably throughout the subject specification, unless context suggests otherwise or warrants a particular distinction among the terms. "Provider" may refer to a person (or persons) that may provide services (e.g., systems, support, etc.) to the user. It is noted that such terms may refer to human entities or automated components supported through artificial intelligence (e.g., a capacity to make inference).

Moreover, terms such as "personalization," "customization," and the like are employed interchangeably throughout the subject specification, unless context suggests otherwise or warrants a particular distinction among the terms. Such terms may refer to the process of substituting default data (e.g., placeholder art, predetermined data, etc.) with new data (e.g., new art) to suit the particular needs of a user, altering values of data on an interactive form, adding user-generated content, or the like. For instance, a user may alter attributes of a font, may add name into a "name" field on an interactive form, may replace an image (e.g., a default image, placeholder image, etc.) with a user-generated image, or the like. It is further noted that embodiments may utilize and/or are applicable to customizable items which may not be actually customized.

It is noted that, terms "user equipment," "device," "user equipment device," "client," and the like are utilized interchangeably in the subject application, unless context warrants particular distinction(s) among the terms. Such terms may refer to a network component(s) or appliance(s) that sends or receives data, video, sound, or substantially any data-stream or signaling-stream to or from network components and/or other devices. By way of example, a user equipment device may comprise an electronic device capable of wirelessly sending and receiving data. A user equipment device may have a processor, a memory, a transceiver, an input, and an output. Examples of such devices include a cellular telephone (e.g., smart phone), personal digital assistant (PDA), portable computer (e.g., laptop computer), tablet computer (tablet), desktop computer, hand-held gaming counsel, wearable (e.g., smart watch), printer (e.g., copy machine, fax machine, smart printer), etc.

"Logic" refers to any information and/or data that may be applied to direct the operation of a processor. Logic may be formed from instruction signals stored in a memory (e.g., a non-transitory memory). In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device. Other terminology and features relative to systems and methods of the present teachings will be described herein, where pertinent. It is noted, however, that these definitions are merely exemplary and that the present teachings are not limited to the aforementioned definitions.

A network typically includes a plurality of elements that host logic. In packet-based wide-area networks (WAN), servers (e.g., devices) may be placed at different points on the network. Servers may communicate with other devices and/or databases. In an aspect, a server may provide access to a user account. The "user account" includes attributes for a particular user and commonly include a unique identifier (ID) associated with the user. The ID may be associated with a particular mobile device(s) owned by the user. The user account may also include information such as relationships with other users, application usage, location, personal settings, and other information.

Embodiments may utilize substantially any wired or wireless network. For instance, embodiments may utilize various radio access networks (RAN), e.g., Wi-Fi, global system for mobile communications, universal mobile telecommunications systems, worldwide interoperability for microwave access, enhanced general packet radio service, third generation partnership project long-term evolution (3G LTE), fourth generation long-term evolution (4G LTE), third generation partnership project 2, BLUETOOTH®, ultra mobile broadband, high speed packet access, $x^{th}$ generation long-term evolution, or another IEEE 802.XX technology. Furthermore, embodiments may utilize wired communications.

It is noted that user equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network may include packet-based communications, radio and frequency/amplitude modulations networks, and the likes. Communication may be enabled by hardware elements called "transceivers." Transceivers may be configured for specific networks and a user equipment device may have any number of transceivers configured for various networks. For instance, a smart phone may include a cellular transceiver, a Wi-Fi transceiver, a BLUETOOTH® transceiver, or may be hardwired. In those embodiments in which it is hardwired, any appropriate kind or type of networking cables may be utilized. For example, USB cables, dedicated wires, coaxial cables, optical fiber cables, twisted pair cables, Ethernet, HDMI and the like. The design of the project may include an efficient method for generating and printing customized items in a system having a client communicable with a network and a server communicable with the network as set forth in U.S. Pat. No. 7,027,001, which is hereby incorporated in its entirety. The client user may be guided through a series of steps to choose a default project item that is compatible with the user's needs (e.g., business cards, binder labels, posters, etc.). After an item is selected, an interactive form may be displayed on the client's computer (e.g., such as through a Website or downloaded software). User information may be entered onto the interactive form, and transmitted from the client's computer (or other device, which may include without limitation, a smartphone, tablet, laptop computer, desktop computer, game console, and the like) to the server over the network.

In some systems, a user may be able to create a design based on a design template. For example, the user may create a design of twenty-four labels positioned to be printed on labels of a sheet comprising twenty-four labels. The design may be saved as a printable file (e.g., PDF, word processing document, image file, etc.). If the user wants to print the same or similar design on a different sheet and/or print medium (e.g., business cards), the user would have to create a new design or manually edit the design to accommodate a different template. This process may be time consuming, frustrating, and difficult for users.

For instance, templates (e.g., template files, templated files, etc.) may be configured to arrange a design according to a physical layout of a product (e.g., a layout of a paper product, arrangement of labels on a sheet, etc.). Templates may be associated with particular types of products. For instance, a label sheet having n labels may be associated with a different (first) template (e.g., format, type, etc.) than a template (e.g., second template) associated with a label sheet having m labels, where n and m are numbers. When a design is applied to a template file and/or created via a template file, the design is arranged to be printed on the associated print-receptive medium. Even small differences between templates may result in unsatisfactory results if a user attempts to print a file of a particular template type on a product that is not designed for the template type. If, for example, a user desired to print a design on a label sheet, the user would create the design via an appropriate template. If the user then desired to print the design on business card stock, the user would then create a new file on a different template. The user may also be required to alter visual parameters (e.g., resolution, aspect ratio, color, size, placement/location, etc.), duplicate/remove instances of the design, or the like.

Systems, methods, and devices disclosed herein may generate multiple printable files (e.g., templated files, etc.) based on a common design. Different printable files may be configured for printing on a specific print-receptive medium and/or printing device. For example, a user may create a design based on a template for a label sheet comprising twenty-four labels. The user may then desire to have a professional print the labels. The professional may utilize a differently sized label sheet and/or a roll of labels. In another example, the user may decide to print the design on business cards, greeting cards, or the like. Embodiments disclosed herein may automatically convert the design without requiring the user to edit, re-create, or otherwise alter the original design. Converting may include, for example, converting a file from a first template to a second template, generating a second printable file from a first printable file (e.g., where the different printable files are associated with different templates), altering visual parameters of images/text or other visual elements, or the like.

In an example, a system may comprise a software product that provides design capabilities (creation and editing of text and graphics) and maps a digital layout of panels or tables on a page (e.g., in a file, a digital page, etc.) in direct correspondence to the physical layout of die-cuts on a sheet of paper; thus, altering (e.g., optimizing, improving, etc.) print quality and accuracy. This may include dynamically altering the location of the design elements based upon the medium onto which the design elements are identified to be printed and/or the type of printer performing the print job. Further still, the system may dynamically alter the print file based upon whether the medium onto which the target is being printed has had the die cuts pre-cut or whether they are cut after printing. The system permits dynamic alteration of the print parameters, including, without limitation, location, color, size, layout, aspect ratios, etc. According to at least one aspect, the system may alter (e.g., improve, optimize, etc.) the design elements for the specific medium, which may alter (e.g., improve) quality of printed objects and/or increase user satisfaction.

The disclosed systems may provide quality control by producing and controlling both the digital and physical aspects of a user's experience (digital design and printed media). Using the systems and/or methods, a user may design a creative project once and have the choice to print that project to media designed for local desktop printing or to submit the project for professional quality printing without further interaction, e.g., without having to modify any of the print parameters previously created by the user. The user may also elect to print their project or design file to different media without having to redesign and/or re-create the project.

In an embodiment, design tools ensure that elements of a user's design are not lost when applying the design to different types of items, such as label sheets, greeting cards, business cards, or the like. The system may dynamically alter the print job to account for these differences—such as, by way of a non-limiting example, the differences in the location of the labels with respect to the sheet passing through the printer.

Customizable items may include appropriate items amenable to printing. Non-limiting examples of such customized items include business cards, invitations, labels (e.g., address labels, shipping labels, CD labels, etc.), flyers, greeting cards, binders, dividers, posters, wall decor, folded cards, postcards, t-shirts, hats, mugs, etc. Customizable items may be represented as sheets (e.g., on a webpage or as part of a downloaded program). Each sheet may contain one or more labels or cards. The display for the labels and cards may vary. For example, labels may be depicted on a sheet containing multiple labels and a card may be depicted as individual designs in a canvas, given that cards may be sold and shipped in stacks (e.g., not sheet form). It is noted that the present disclosure is not limited to these types of print media. Any appropriate print media may be utilized with the present teachings.

It is noted that users may include unique images or text on each label or card. When the design of each label or card is different, this variable content is also applied to create the number of label sheets or individual cards needed to ensure nothing is lost or deleted. For example, the system may accomplish this by dynamically altering the location of the content with respect to the applicable print medium on which the content is printed. This may all be done without user interaction. The user may not need to change the file type or change any data of the file. The present system may, for example, dynamically modify the file type based upon the applicable printer on which such is to be printed. The system may then save both file types, e.g., the one for the remote printer and the one created for the local printer.

In another aspect, the present disclosure relates to a system and method for generating a customized item and printing it at any type of printer or to any location. The system and method may provide for a configurable design tool that meets the needs of various design applications for generating a customized item and printing that item at any type of printer or to any location.

At least one embodiment of the present disclosure is an efficient method for designing a project (e.g., a customized item such as business cards, invitations, labels, etc.) and then preparing that project for printing to any printer type or location such as a local desktop printer or a remote professional digital press for fulfillment.

The described systems and/or methods allow a user to create a project once, optionally save the project (e.g., to a user account, on a user's hard-drive or on a storage medium), and print the project to any type of printer (e.g., a desktop printer or a professional printer) or to any location (e.g., local or remote). The described systems and/or methods may save users time, increase user satisfaction, and/or may be more efficient than traditional systems.

In one embodiment, the systems and/or methods may allow a user to design an item/project and print it to multiple printers/locations without having to provide input to alter the design or the format of the design. For example, a user could design a project and print it locally. The user may additionally and/or alternatively send (e.g., via a user device) a request to facilitate printing of the project to a professional printer by, for example, simply clicking a button on a Webpage. In an aspect, the systems and/or methods may create appropriate files comprising visual elements of the project arranged according to appropriate templates. It is noted that the user may design a project for a professional printer and then convert a file for printing on a user printer.

In another embodiment, the systems and methods may allow a user to create a source design and print it to multiple printable media products without modifying the source design, e.g., the user need not modify the source design. Thus, a user could create a source design and use that same source design to create two different items without the user having to modify the source design to account for changes in the dimensions (e.g., size or shape), layouts, or other parameters of the different printable media products. In an aspect, disclosed embodiments may automatically execute operations to apply and/or facilitate application of appropriate changes without user intervention. For example, a user could use the same source design to print to an 8½ in.×11 in. sheet of labels or a 12 in.×18 in. sheet of labels without having to re-create, modify, or reload the design. For instance, a system may modify the source file and/or create a second source file without user intervention. In another example, a user could create a source design which the user may want to use on a business card and on an address label. The business card and the address label may be printed without the user having to modify the source design to fit onto either the business card or the address label. As described herein, the systems and methods may modify the source file or create a second source file without user intervention. In another aspect, the user may also print the design to multiple printers/locations without having to modify the source design. While the present teachings allow a user to use the same source design to print to multiple printable media products without modifying the source design, this does not mean the user cannot modify the overall design of the product. For example, the systems and methods of the present disclosure may allow a user to design a business card and address label that include the same logo but have different text.

Referring now to FIG. 1, there depicted is a block diagram of a functional printing system 100 that may generate and/or print customized items in accordance with various described embodiments. Printing system 100 may primarily include customization component 106, memory 102, and processor 104. Memory 102 may be configured for storing computer executable components such as a design component 110, a conversion component 120, a print component 130, and a user account component 140. Processor 104 may facilitate operation of the computer executable components. It is noted that system 100 may include one or more devices, such as a user device, a printer, or the like. It is further noted that one or more devices may comprise, at least in part, the various components. For instance, a single component of system 100 may be comprised by one or more devices. In another aspect, while shown as separate or distinct components, the components of system 100 may be comprised by one or more components.

The printing system 100 may allow for efficient designing and/or printing of a project, such as a customized item (e.g., business cards, invitations, labels, or the like). In another aspect, the printing system 100 may be configured to prepare the project for printing to an appropriate printer on a desired print medium. The printer may be a printer directly or indirectly connected to the printing system 100, such as a desktop printer, personal printer, network printer, or the like. In another aspect, the printer may be a printer of a service provider (e.g., a commercial printer). The printing system 100 may allow a user to design a project and the system may automatically (e.g., without user intervention) format and/or convert the project based on whether the user prints the project or orders prints of the project from a service provider.

Design component 110 may be configured to generate a user project. The project may be a design project for printing on a print-receptive medium. For example, a user may wish to create a custom design for a label, such as with a user-generated or uploaded picture. The user may upload the picture (e.g., design component 110 may receive as input 114) to the printing system 100 from a user device and/or may capture the picture via a user device (e.g., digital camera, scanner, smart phone, etc.). The design component 110 may comprise tools allowing a user to edit, save, upload, or otherwise alter their design. In an example, the user may utilize a desktop computer, laptop computer, tablet computer, smart phone, or another device to interact with printing system 100, such as via an application (e.g., "app," etc.), website, or the like.

In an aspect, the design component 110 may provide tools for customization of a design. For instance, the design component 110 may provide tools that allow a user to add an image to a design. The image may be a user-generated image, a captured image (e.g., such as with a digital camera, scanner, etc.), an image selected from a file (e.g., an image stored in a database), or the like. In another aspect, the design component 110 may receive user input to add textual data, barcodes (e.g., linear barcodes, matrix barcode, such as QUICK RESPONSE CODE (QRC), or the like), or other visual elements to the design. It is noted that visual elements may be in any desired format or file type (e.g., graphical image format (GIF), Joint Photographic Experts Group (JPEG), JPEG 2000, raw image format (RIF), bitmap (BMP), portable network graphics (PNG), etc.).

According to at least one aspect, the design component 110 may render a project editing/generating screen to allow a user to visualize and/or alter the project. For example, the design component 110 may generate/render design interface 200 and/or design interface 300. In another aspect, the design component 110 may provide tools, such as text editing tools 210 and/or image editing tools 214. A user may interact with an interface device (e.g., touch screen, computer mouse, keyboard, microphone, etc.) to provide input and/or make desired selections for editing text via the editing tools 214 and/or editing images via image editing tools 214. It is noted that design component 110 may provide various other tools for editing the design.

In another aspect, the design component 110 may provide a design area or canvas 220. The canvas 220 may represent an area where a user may view a position of various visual elements. For example, the canvas 220 may provide a rendering of a graphical image 222, a textual image 224 (e.g., text box), barcode 226 (or other inventory, tracking, and/or scannable elements), or the like. It is noted that a design may include any number of visual elements. In another aspect, the design component 110 may provide one or more borders and/or margins that indicate areas/parameters for printing on a desired medium. For example, the design component 110 may identify an internal or safe area 230, a danger or bleed area 234, and/or an absolute border 238. The safe area 230 may represent an area that is not subject to bleeding and/or cutoff due to the print-receptive medium and/or printer. The bleed area 234 may represent an area that may be at risk of bleeding and/or cutting. This area may represent an area needed to accommodate variances and/or error tolerances of printing and/or cutting, such as for labels, die-cut products, or the like. The absolute border 238 may represent a border where an image will not print on a desired print-receptive medium. The borders and/or areas may be depicted on the canvas to inform users where to place visual elements. This may ensure that designs positioned on physical materials generally match what is displayed on a screen. In an aspect, warnings may be rendered or otherwise generated (e.g., audio, visual, etc.) when visual elements are outside of the safe area 230, bleed area 234, and/or absolute border 238. In another aspect, design component 110 may render visual elements differently in the different areas. For instance, graphical image 222 may be altered (e.g., shaded or dulled) in the bleed area 234 compared to the safe area 230. In another aspect, the graphical image 222 may be altered (e.g., shaded or dulled) when passed the absolute border 238 in comparison with the portions thereof in the bleed area 234 and/or the safe area 230. It is noted that a user may provide input 114 instructing design component 110 to alter visual elements by moving, enlarging, shrinking, altering parameters (e.g., color, hue, opaqueness, etc.), rotating, or otherwise manipulating the visual elements.

Figure 2:
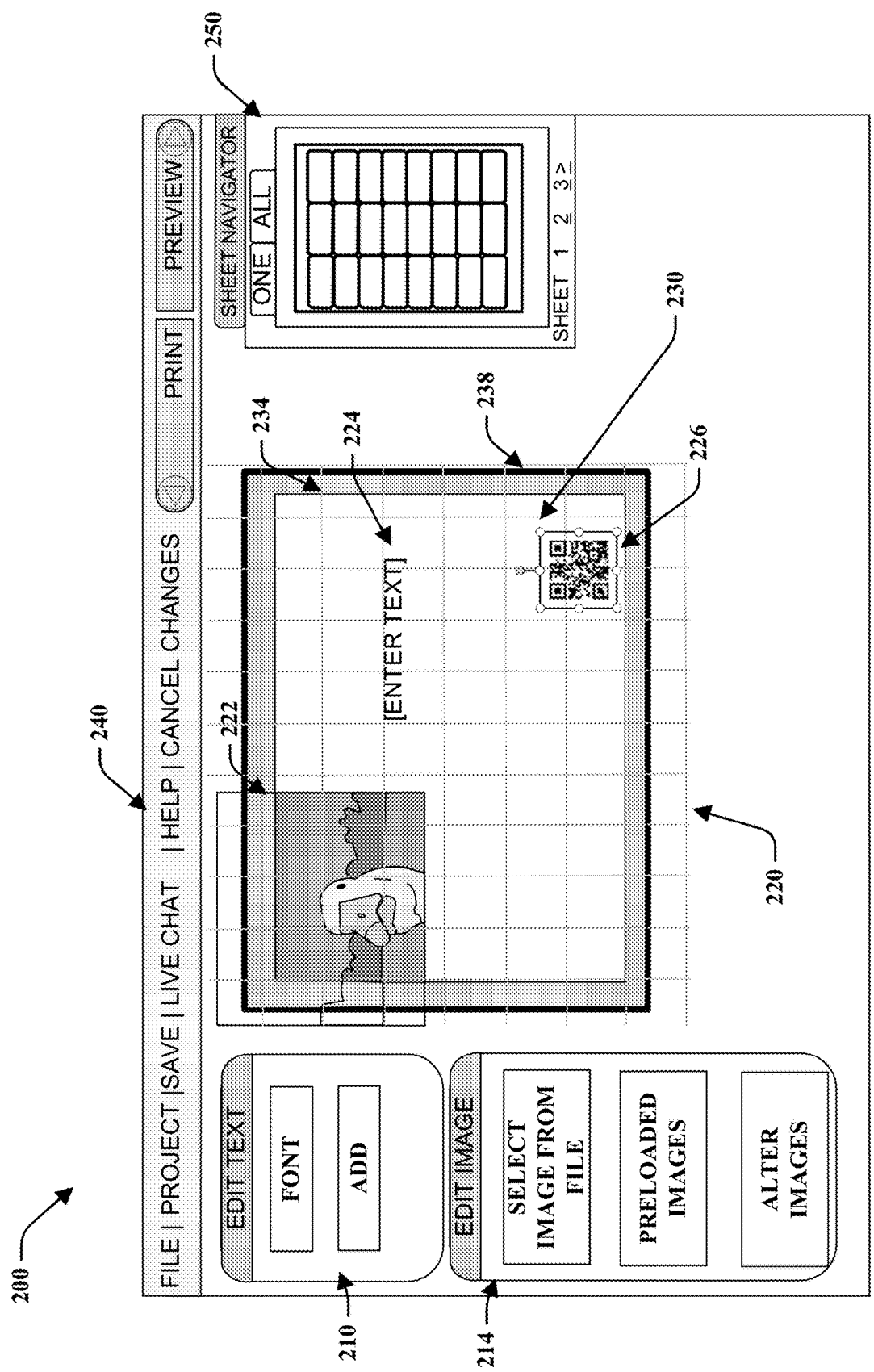
FIG. 2 is an example interface for designing a project with the system, in accordance with various described embodiments.
Figure 3:
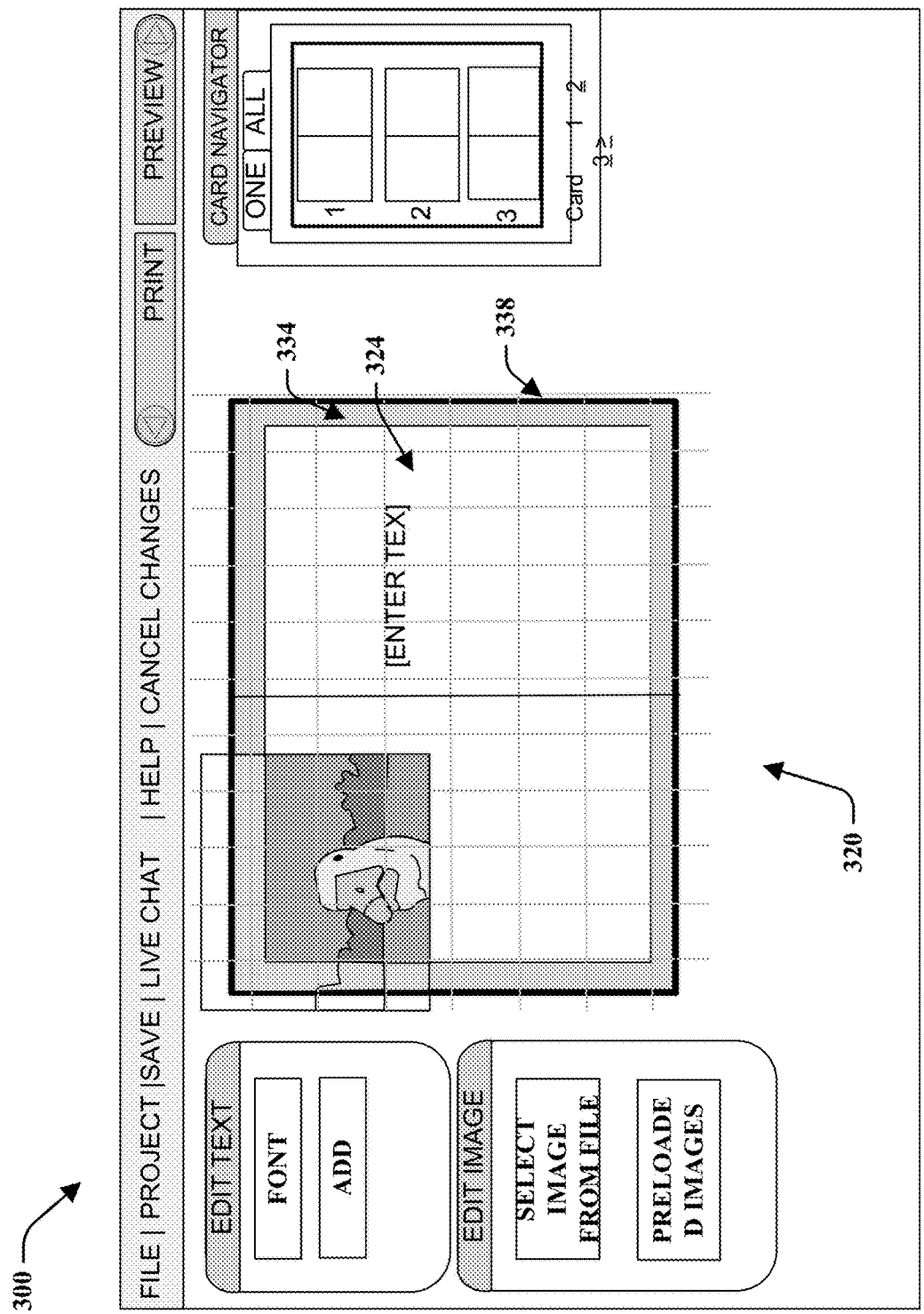
FIG. 3 is an example interface for designing a project with the system including a card navigator, in accordance with various described embodiments.

In at least one aspect, the size of the safe area 230, bleed area 234, and/or absolute border 236 may be determined based on a desired print medium. For instance, FIG. 2 illustrates an exemplary design for one or more labels while FIG. 3 illustrates an exemplary design for one or more cards (e.g., greeting cards). Canvas 300 may comprise safe area 330, bleed area 334, and/or absolute border 338 that may be different dimensions from safe area 230, bleed area 234, and/or absolute border 238 of canvas 200.

Figure 4:
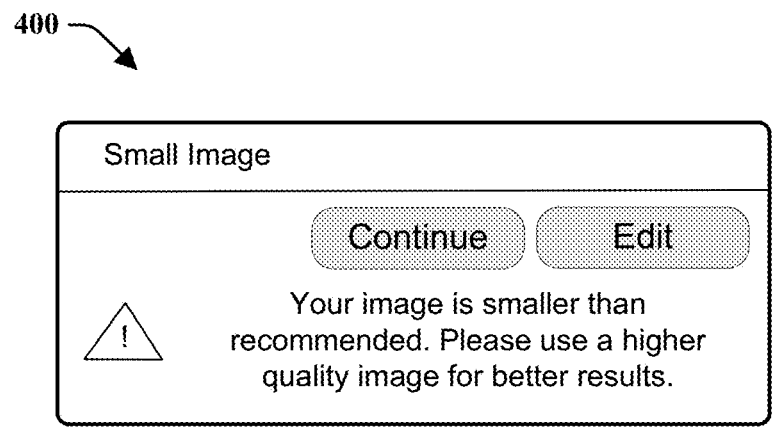
FIG. 4 is an example warning generated by the system, in accordance with various described embodiments.
Figure 5:
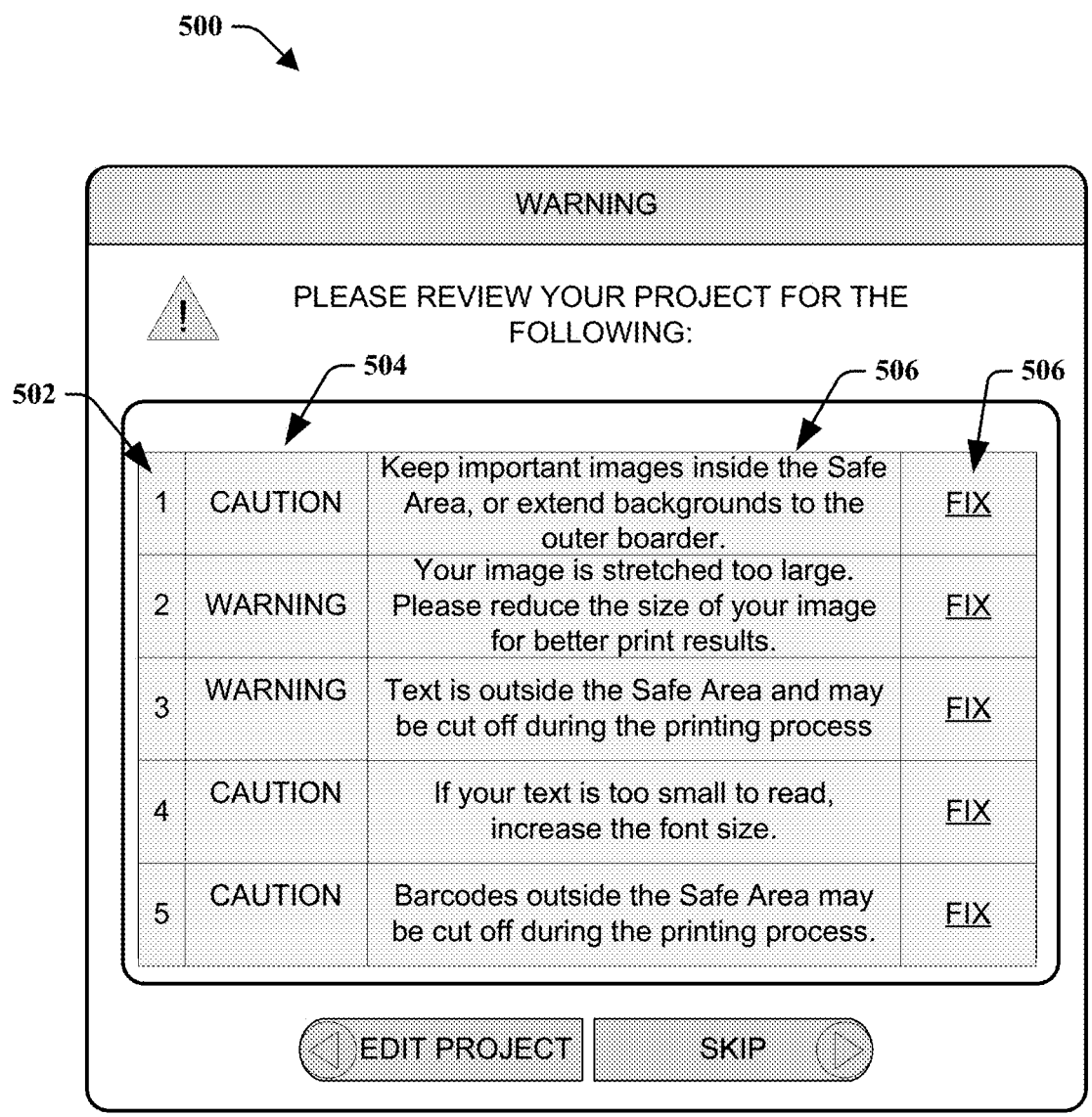
FIG. 5 is an example warning box generated by the system including multiple warnings, in accordance with various described embodiments.

The design component 110 may include a mechanism to generate and/or render warnings. The warnings may comprise visual, audible, tactile (e.g., such as vibrations in mobile applications), or other warnings. The warnings may relate to parameters of the visual elements. For example, the warnings may relate to a position (e.g., relative to canvas and/or other visual elements), resolution, aspect ratio, color, transparency, or the like of graphical image 222 and/or barcode 226. In another example, the warnings may relate to aspects of textual image 224 such as the position, size (e.g., font size), spelling/grammar, or the like. In another aspect, a warning may include a solution or course of action to remedy the warning and/or a selectable tool for directing a user to correct the image. It is noted that the system may render warnings individually (e.g., as shown in FIG. 4) and/or in composites (e.g., as shown in FIG. 5). In at least one embodiment, the warnings may comprise a popup box, fly-out, or the like.

For instance, warning 400 of FIG. 4 may warn a user that, "Your image is smaller than recommended. Please use a higher quality image for better results." The user may proceed with the image or may edit the image, such as providing a higher quality or larger image. As shown in FIG. 5, warnings 500 may comprise a number of warnings. The warnings may include an identifier (ID) 502, a warning type 504 (e.g., caution, warning, etc.), a description 506, and/or a link 506 to fix or remedy the warning. The warning type 504 may include various taxonomies and/or scales of warnings that may indicate a severity of a warning and/or likelihood of potential errors. For instance, a "caution" type warning may indicate a potential for an error, while a "warning" type may indicate a greater likelihood for an error. It is noted that a user may chose to remedy the warnings and/or may ignore the warnings. It is further noted that the warning 400 and/or 500 may be displayed (or otherwise communicated to a user) upon occurrence of a triggering event that may occur at any time, such as after printing system 100 receives input indicating a user desires to print or add an order to a cart, after an error is detected, when a user opens or saves a project, or the like.

In an embodiment, the printing system 100 may render landing pages for each category of print-receptive item (e.g., address labels, business cards, etc.). These pages may pass information such as SKU and promo/discount code information to the printing system 100. In another aspect, a user may switch between types of print-receptive items from a single page. In an example, the user may preview a final project and/or individual project via a navigator tool, such as sheet navigator 250 and/or card navigator 350.

In another aspect, the design component 110 may provide a menu bar 240 that may provide a user with tools and/or controls. The tools and/or controls may allow a user to save a project, select a project, contact a support service, review help menus, cancel changes, or the like. It is noted that the design component 110 may provide various other controls for a user.

In an embodiment, the printing system 100 may allow a user to print a project with a local printer and/or order professional prints from a service provider. For example, the printing system 100 may interface with an ecommerce platform to retrieve unique order information and pass order details, including product configuration and links to project files, for printing. This allows a user to edit before placing an order. For instance, a user may desire to utilize the same design for multiple orders/printing processes or the user may make changes before ordering/printing.

Figure 6:
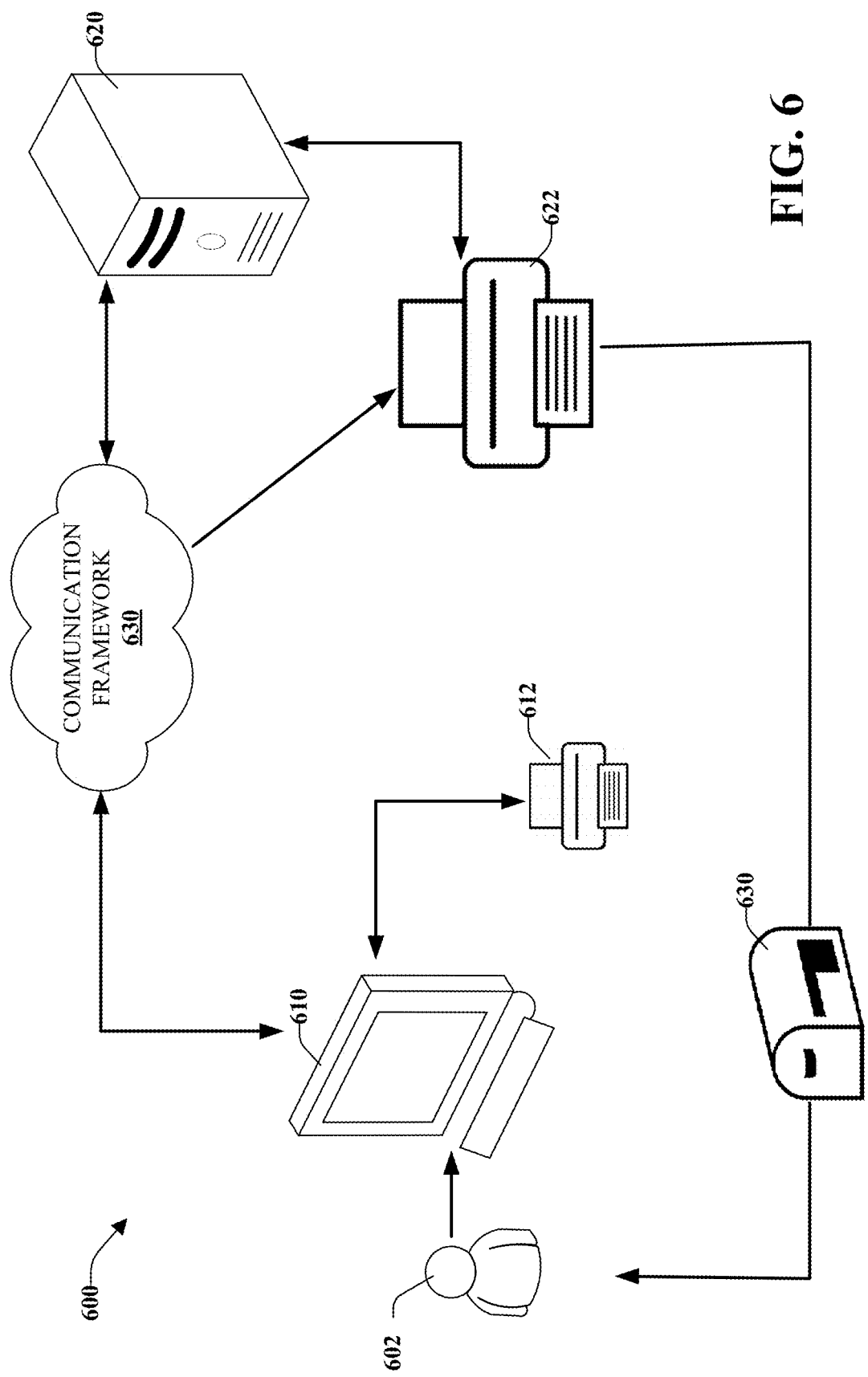
FIG. 6 is an environmental diagram of a printing network, in accordance with various described embodiments.

Turning now to FIG. 6 with reference to FIG. 1, there is an exemplary environment 600, in accordance with various disclosed embodiments. It is noted that printing system 100 may comprise some or all components of environment 600. A user 602 may interact with a user device 610 to design a project or otherwise access a project. The user device 610 may comprise a desktop computer, laptop computer, smart phone, tablet, or the like. In an aspect, the user device 610 may be coupled to (and/or integrally formed with) local and/or user printer 612. It is noted that the user device 610 and user printer 612 may be a common device, may be communicated via wireless and/or wired connections, or the like. While described as a local/user printer, user printer 612 may be a commercial printer that may be located at a place of work, library, retail store, or the like. For instance, a user 602 may design a project and may store the project to a server or database 620 (e.g., and/or to storage devices). The user 602 may access the user printer 612 to print the project. In an example, the user 602 may create a project via the user's personal computer (e.g., user device 610). The user 602 may save the project to removable memory device (e.g., thumb drive) and may travel to a retail store that offers printers (e.g., user printer 612) for rent and/or public use. In an aspect, the user 602 may load a desired print stock (e.g., label sheet, card stock, etc.) to the retail printer and initiate printing. In other examples, the user printer 612 may be a printer located at the user's residency and/or connected to the user's home network.

Figure 7A:
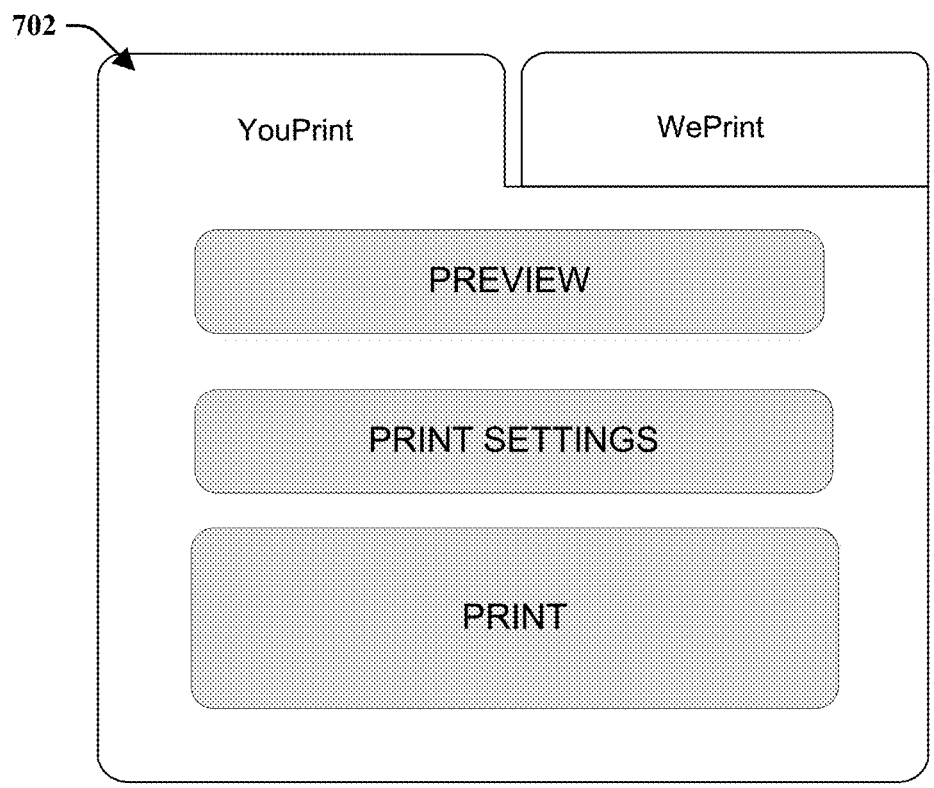
FIG. 7A depicts an exemplary interface of a printing system associated with selection of local printing, in accordance with various described embodiments.
Figure 7B:
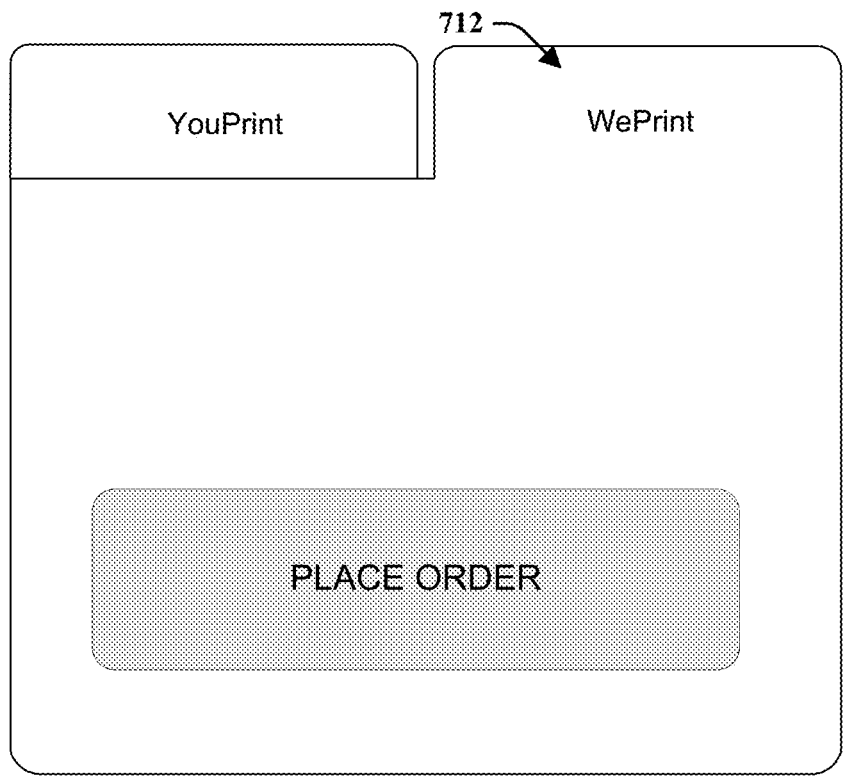
FIG. 7B is an exemplary interface of a printing system associated with selection of professional printing, in accordance with various described embodiments.

According to embodiments, the user 602 may provide input to the user device 610 to design or otherwise access a project (e.g., such as a saved or public project). The user 602 may choose to print the project via user printer 612 and/or via a professional printer 622. For instance, user 602 may provide input to user device 610 to print to the user printer 612, such as via selecting to print via the "YouPrint" tab 702 shown in FIG. 7A. The user 602 may additionally and/or alternatively select professional printing via the "WePrint" tab 712 of FIG. 7B. It is noted that the renderings depicted in FIGS. 7A and 7B may be rendered by printing system 100. It is noted that the user 602 may be required to make a payment if the user 602 requests professional printing.

Figure 8A:
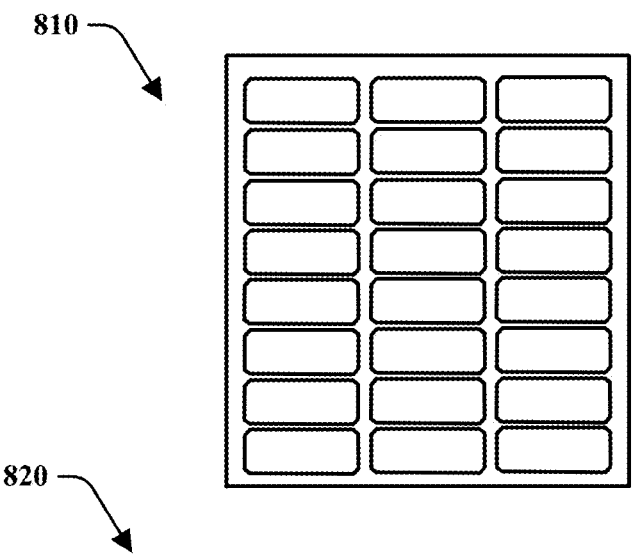
FIG. 8A-C are exemplary print-receptive mediums, in accordance with various described embodiments.
Figure 8B:
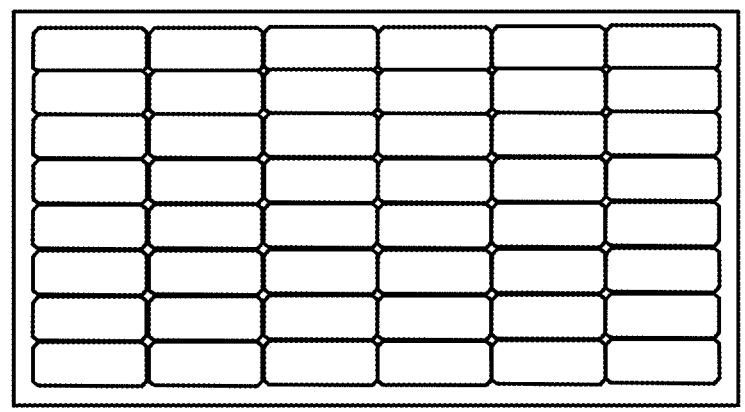
Figure 8C:
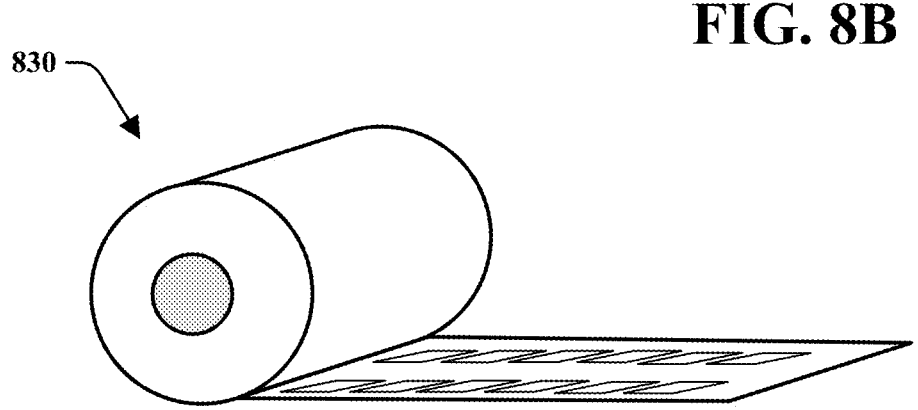

In at least one embodiment, the user printer 612 may be associated with specific types of print-receptive media. The print-receptive mediums may comprise particular layouts and/or properties. For instance, address label sheet 810 of FIG. 8A may be usable with user printer 612 and may have twenty-four labels with spaces added between each label panel. In another aspect, address label sheet 820 of FIG. 8B and/or address label roll 830 of FIG. 8C may be usable with one or more professional printers 622. Address label sheet 820 may comprise forty-eight address labels with no bleed areas on an 8.5 in.×11 in. sheet. It is noted that other appropriate label sheets may be utilized. It is further noted, as described herein, that other print-receptive media may be utilized.

In embodiments, the user 602 may design a project and printing system 100 may convert and/or prepare the project for differently formatted print-receptive mediums. For example, conversion component 120 may convert the project based on a desired method of printing (e.g., user printing and/or professional printing). In at least one embodiment, the conversion component 120 may store multiple files for a project. Each file may be associated with a particular print-receptive medium or layout. For example, a first file may be stored for user printer 612 and a twenty-four label sheet, while a second file may be stored for professional printer 622 and a forty-eight label sheet. The conversion component 120 may, without user intervention (e.g., automatically), create the files, whereby each file may be utilized by a specific printer and/or for a specific print-receptive medium. The user need not take any further action to edit a design. In an aspect, conversion component 120 may manage the content of a target file in a table cell and dynamically alter the location of the content based upon the printer and medium on which it is to be printed. It is noted that conversion component 120 may retrieve information related to printers from a computer-readable memory store (e.g., memory 102, server 620, etc.), may receive the information from user input, or the like. This may allow user 602 to seamlessly order from a professional printing service as well as print their own labels via user printer 612. Once user 602 orders the prints (e.g., an order communicated via communication framework 630), a professional printing service may print the project via professional printer 622 and may ship, deliver (e.g., to user mail 630), or otherwise make the professional prints available (e.g., pickup, delivery to one or more locations, etc.) to user 602.

As an example, conversion component 120 may allow the user 602 to print the design on a selected document and/or item via a first and/or second printer without having to take any additional steps to arrange or alter a design for such document and/or item. For instance, a user is not required to create separate projects based on whether the user desires to print via their own printer or order prints from a professional printing service. Rather than require user action, conversion component 120 may convert or modify (e.g., optimize) the format of a project file. It is noted that the conversion component 120 may modify the format prior to (e.g., in advance of) sending a print request (e.g., as output 112) to a selected printer. In another aspect, conversion component 120 may apply the contents of the user's source file to a new template to ensure that the project is formatted properly for professional printing (e.g., it may allow printing of the new target design to be altered or optimized for the medium onto which it is being printed without user intervention). In at least one embodiment, the conversion component 120 may generate an alert (e.g., visual, audible, tactile, etc.) to inform the user 602 of any modifications which may be or have been automatically applied to modify (e.g., optimize) the project for a selected printing method/device (e.g., professional printing, user printing, etc.) and/or suggest user modification or approval of actions to improve printing results (e.g., such as described with reference to FIGS. 4-5).

In another example, a user may indicate that a project is complete by saving, printing, and/or ordering prints from a professional printer. As described here, the user 602 may select any of a plurality of printers, types of printers, printer locations, or the like. For instance, the user may print the project via the user printer 612 and/or professional printer 622. After the user finalizes/completes the project and provides input for printing, conversion component 120 may determine appropriate printer types without user intervention. It is noted that conversion component 120 may create appropriate printable files once the type(s) of printers are selected, without printer types being selected, or the like. In at least one example, the conversion component 120 may communicate with user account component 140 to determine likely file types for a user project at any time, such as during a time when a user is idle or is otherwise not altering a project. The likelihood of file types may be based on, for example, a user's history (e.g., which may be stored by user account component 140), a designated print-receptive medium (e.g., labels, business cards, hats, mugs, etc.), or the like. The conversion component 120 may generate printable file types for any file type exceeding a certain threshold (e.g., highest relative likelihood, over 50% chance of ordering, or the like). In an aspect, this may allow the conversion component 120 to reduce a wait time experience by a user 602.

In at least some embodiments, the user 602 can provide input to the printing system 100 to print the project via any combination of the printer types or locations without modifying the source design or the source file that contains the design. For example, the user may select to print the project on any type of document or item (e.g., business cards, invitation, labels, banners, t-shirts, yard signs, etc.). The conversion component 120 may create the appropriate printable file for the applicable printer. In these embodiments, the system may manage the content of the print target and dynamically alter the location of the content to be optimized based upon the medium onto which the project is printed. For instance, the user may print the design without having to provide input 114 to modify the design by selecting (e.g., by drop down menu on the Webpage or on the downloaded program) the media onto which the design will be printed. In these embodiments, the conversion component 120 modifies (e.g., optimizes, generates, etc.) the printable file based upon the medium onto which it is to be printed without requiring the user to provide input to modify a design. For example, the user need not reposition, resize, or otherwise alter parameters of a visual element (e.g., graphical image 222, textual image 224, and/or barcode 226).

It is noted that user printer 612 and professional printer 622 may comprise a plurality of printer types or locations, such as a local desktop printer or a remote professional digital press for fulfillment. The plurality of printer types is not limited to any particular type of printer. Embodiments of the present teachings may be applied to any type of printer, including, without limitation, commercial printing devices, inkjet printers, laser printers, dot matrix printers, digital printers, bubble jet printers, electrophotography printers, sold ink printers, heat transfer printers, etc.

Print component 130 may request printing of a project. In an aspect, the print component 130 may comprise print drivers or other interfaces that may interact with a printer. Print component 130 may receive a printable file from conversion component 120 and may instruct a printer (e.g., local printer 612) to print a project and/or may send a print request (e.g., order) to a professional printing service that may print the project via professional printer 622. In at least one embodiment, the print component 130 may comprise one or more printers. It is noted that print drivers may read printable files for printing on a specific printer. Such may not be considered conversion of a file type as described herein.

While conversion component 120 may generate different types of printable files in at least some embodiments, other embodiments may alternatively or additionally include print component 130 which may generate different printable files. For instance, in one embodiment, conversion component 120 may generate different printable files that may be stored for later use and/or may be sent to print component 130 for printing. In other embodiments, conversion component 120 may generate a raw project file. The raw project file may comprise a printable source file or source design that can be used by a plurality of printer types at any printer location, including printing the source file or source design on user printer 612 and/or on professional printer 622. Print component 130 may receive the raw project file and may convert the raw project file based on the selected printer. It is noted that other processes for creating the different printable files are within the scope and spirit of this disclosure. In other words, the same source file or design may be used, but the printable file that gets created therefrom may be different depending on the targeted printer. Print component 130 may generate the different printable files automatically (e.g., without requiring a user to modify the source design). For example, a customized business card may be created on a Website and saved to a user account, such as via user account component 140, associated with a user entity (e.g., user identify (ID), user device 610, etc.). The user 602 may provide input to user device 610 to instruct user printer 612 to print this customized business card. The user 602 may additionally or alternatively provide input to user device 610 that initiates transmission, via communication framework 630, of an order to a professional printing service, which may print the order via professional printer 622. By way of example, this means that the user 602 could utilize user device 610 to print the business card via user printer 612, for example, an 8½ in.×11 in. sheet containing pre-cut business cards and/or via professional printer 622 on, for example, an 11 in.×17 in. sheet containing pre-cut business cards, a rolled sheet (which may be die-cut), or the like, without the user 602 having to re-create, modify, or reload the source design.

In at least some embodiments, the conversion component 120 and/or print component 130 may adjust parameters (e.g., color, saturation, etc.) to accommodate different printing capabilities of applicable printers. For example, imagery for projects to be printed via user printer 612 may be saved or otherwise transmitted to the applicable printer in a first color mode (e.g., RGB). Projects to be printed professionally may be saved or otherwise transmitted to the applicable printer (e.g., professional printer 622) in a second color mode (e.g., CMYK). In such embodiments, the conversion component 120 and/or print component 130 may dynamically alter the color parameters based upon the capabilities of the applicable printer. In an example, conversion component 120 may alter parameters based on a selected printer type and/or print medium. Print component 130, in at least one example, may further alter parameters according to specifics of the printer. For example, print component 130 may comprise specific drivers and/or may be comprised, at least in part, by a specific printer. By way of a non-limiting example, the user may create a print project in color. However, the user printer 612 to which the user is printing may not have the capability to print in color. The printing system 100 may dynamically alter the print job to convert the color to the appropriate color gamut of the targeted printer.

In another aspect, printing system 100 may allow appropriate image types to be uploaded and used in a design. Resolution and color setting vary from screen to screen. To increase accuracy of representations, the design component 110 and/or print component 130 may verify images and ensure colors displayed on the screen are in the same color range as those that can be printed at the specific printer requested.

Printing system 100 may save projects and/or other information to a user account via user account component 140. In examples, user account component 140 may alter or access a user account associated with a user entity that may be identified by a user ID (e.g., user name, user email address, etc.), a user device, or the like. The user account may comprise project data (e.g., past projects, past orders, etc.), payment data, settings data, or the like. User account component 140 may allow a user to provide input to alter (e.g., update, change, add/remove, etc.) portions of the user account. In another aspect, the user account component 140 may store projects (e.g., via memory 102, database 620, or the like) for future use by the user 602 and/or other users. For example, a user may (at any time) share their project with select users (e.g., friends or contacts on a social media network), all users, or no users.

In at least one embodiment, user account component 140 may store the source file or project created for one or more printers. For instance, the source file may be saved for a first targeted printer (e.g., user printer 612) and a second targeted printer (e.g., a professional printer 622). In an aspect, the user account 140 may open or access a source file stored in memory for a first target printer, then printer component 100 may convert (e.g., optimize) the source file for the second target printer (such as via conversion component 120). In an example, conversion component 120 may apply the contents of the original source design to a different or new template for the second targeted printer. Conversion component 120 may apply optimizations to generally ensure accurate alignment, color corrections, etc. In at least one embodiment, the conversion component 120 may alert the user if any modifications are needed for improved (e.g., best, optimal) quality printing and/or may automatically make modifications based on a history of previous user actions, and/or stored preferences in a user account.

According to an example, the conversion component 120 may generate files as PDFs. This may allow the user 602 to reuse projects and/or may ensure proper printing either by the user or by a professional printing service. Such may be particularly efficient and/or useful in embodiments that may allow the user 602 to use these same project files to print on different printers, e.g., on a local printer and a remote printer.

Saving the project may allow a user to initiate printing and/or alteration of the project at some later time. In an example, the user may also choose to initiate printing of the project via different printing devices without requiring the user to modify the project. This may be particularly useful in situations in which the user creates a design and then repeatedly prints this design. The user 602, without further modification of the design, may be able to print that job at a user printer 612 and then at a professional printer 622. By way of a non-limiting example, this may be particularly useful in a situation in which a user designs a business card after purchasing a pre-die-cut sheet of business cards for immediate use. That user may then send an order for the same design to a professional printing service. The professional printing service may be able to produce the business cards in large quantities, at reduced cost, faster than the user, and/or at different (e.g., greater) qualities. As noted herein, the user will not have to modify the design or create a new project based on different templates.

In an aspect, the printing system 100 may generate a preview interface 900 (e.g., via user device 610), which may comprise a rendering of one or more previews of a project and/or preview checklist. The printing system 100 may render the preview interface 900 in response to receiving input from user 602. For instance, the printing system 100 may render preview interface 900 based on receiving an indication that a user is ready to print and/or order prints of the project (e.g., such as via the YouPrint tab 702 and/or WePrint tab 712), when a user selects a preview control, or the like.

Figure 9:
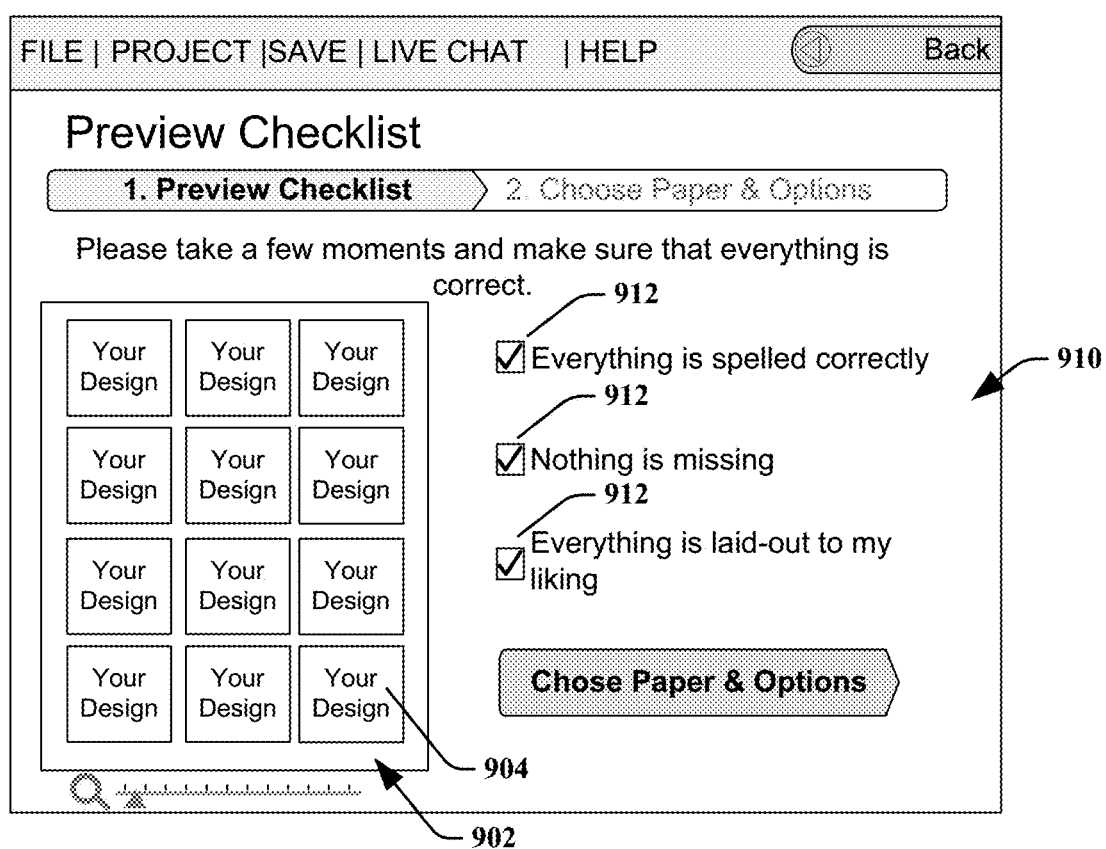
FIG. 9 is an exemplary interface of a printing system including a preview of a project, in accordance with various described embodiments.

The preview interface 900 may include a design preview 902 that may include one or more design elements 904. As depicted, the design elements 904 may represent labels on a label sheet. It is noted that the design elements 904 may comprise various numbers of designs, may comprise similar or identical designs, disparate designs, or the like. In another aspect, the preview interface 900 may include a preview checklist 910. The preview checklist 910 may comprise reminders and/or notifications that may remind a user to perform certain actions and/or redundancy checks. For example, the preview checklist 910 may comprise reminders to check spelling/grammar, ensure the design is complete (e.g., nothing is missing from the design), the layout of the design is to the user's liking, or the like. In at least one embodiment, the user may be required to provide input acknowledging that the user has completed the checklist. For instance, the preview checklist 910 may comprise one or more selectable (e.g., interactive) elements 912. The selectable elements 912 may be selected by a user as the user completes tasks and/or may be automatically selected (e.g., checked as shown in FIG. 9) by printing system 100.

Figure 10:
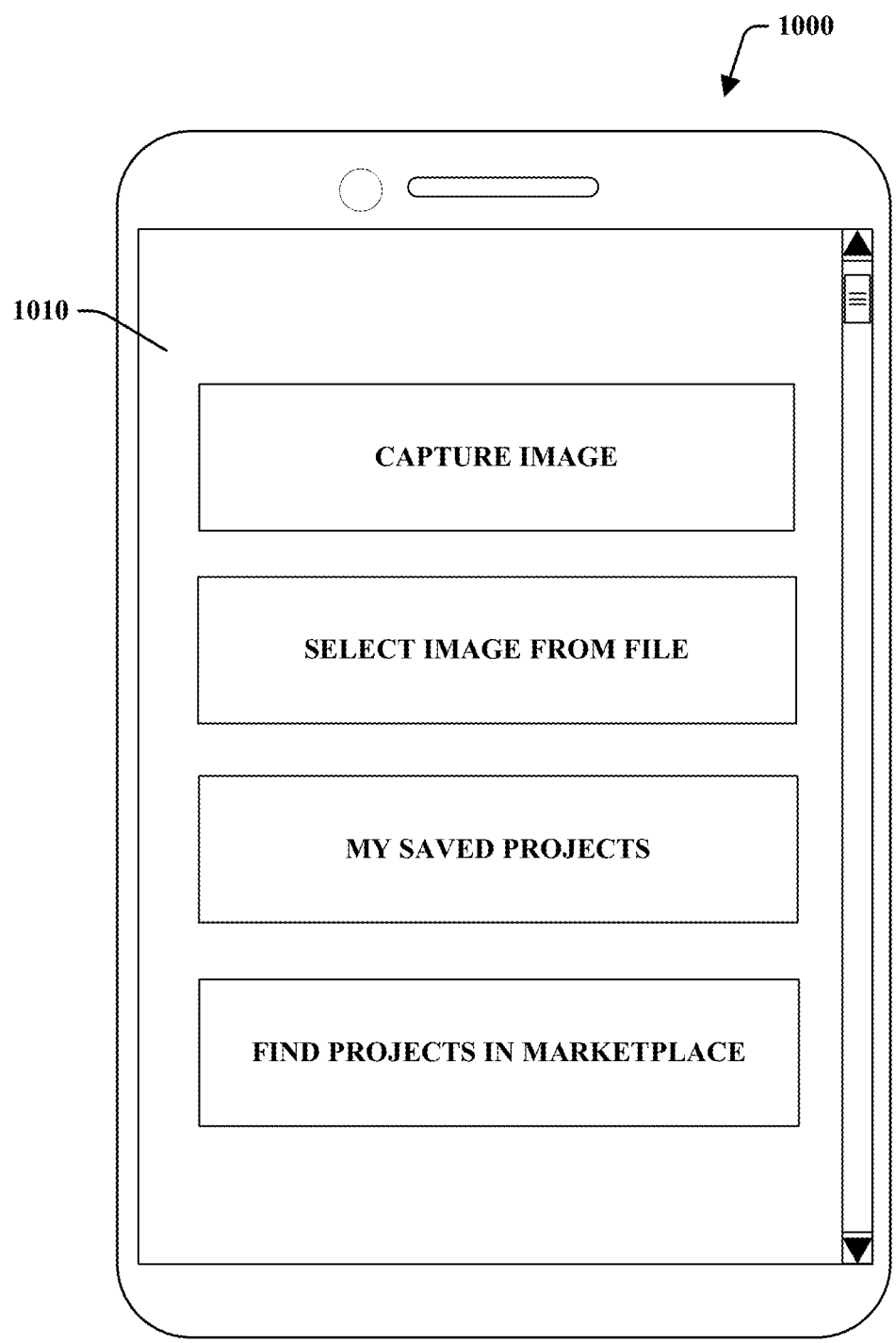
FIG. 10 is an exemplary user device, in accordance with various described embodiments.

FIG. 10 is an example user device 1000 that may comprise at least a portion of and/or interact with printing system 100. As depicted, the user device 1000 may comprise a mobile device, such as a cell phone, tablet, and/or personal digital assistant. It is noted that the user device 1000 may comprise other types of devices as described herein. In an aspect, the user device 1000 may comprise an interface 1010. The interface 1010 may comprise, for example, a touchscreen that may display information and/or receive user input. In embodiments, the interface 1010 may render various screens and/or images.

Figure 11:
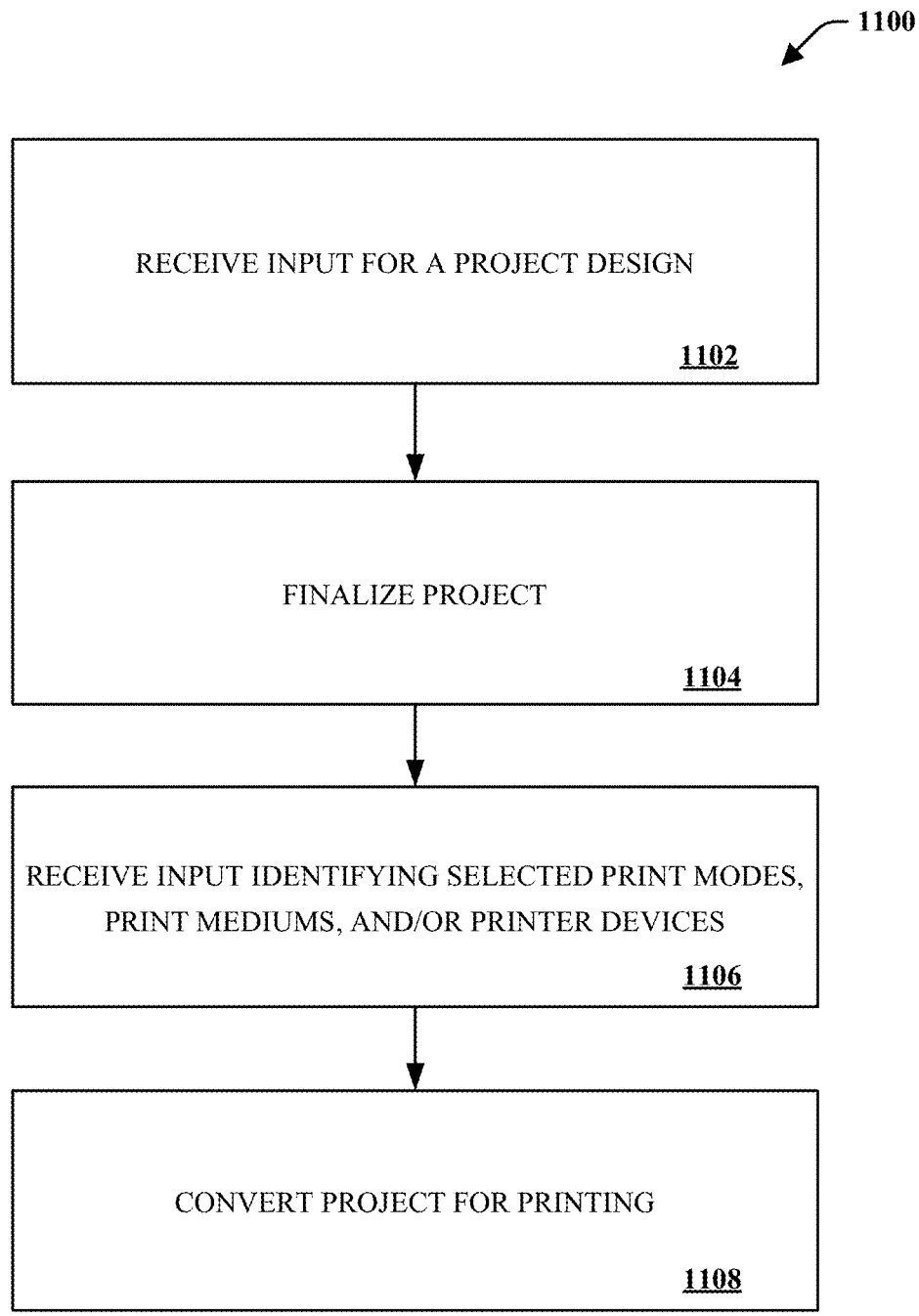
FIG. 11 is a flow diagram of an exemplary method associated with a printing system that may facilitate design of a project, in accordance with various described embodiments.
Figure 12:
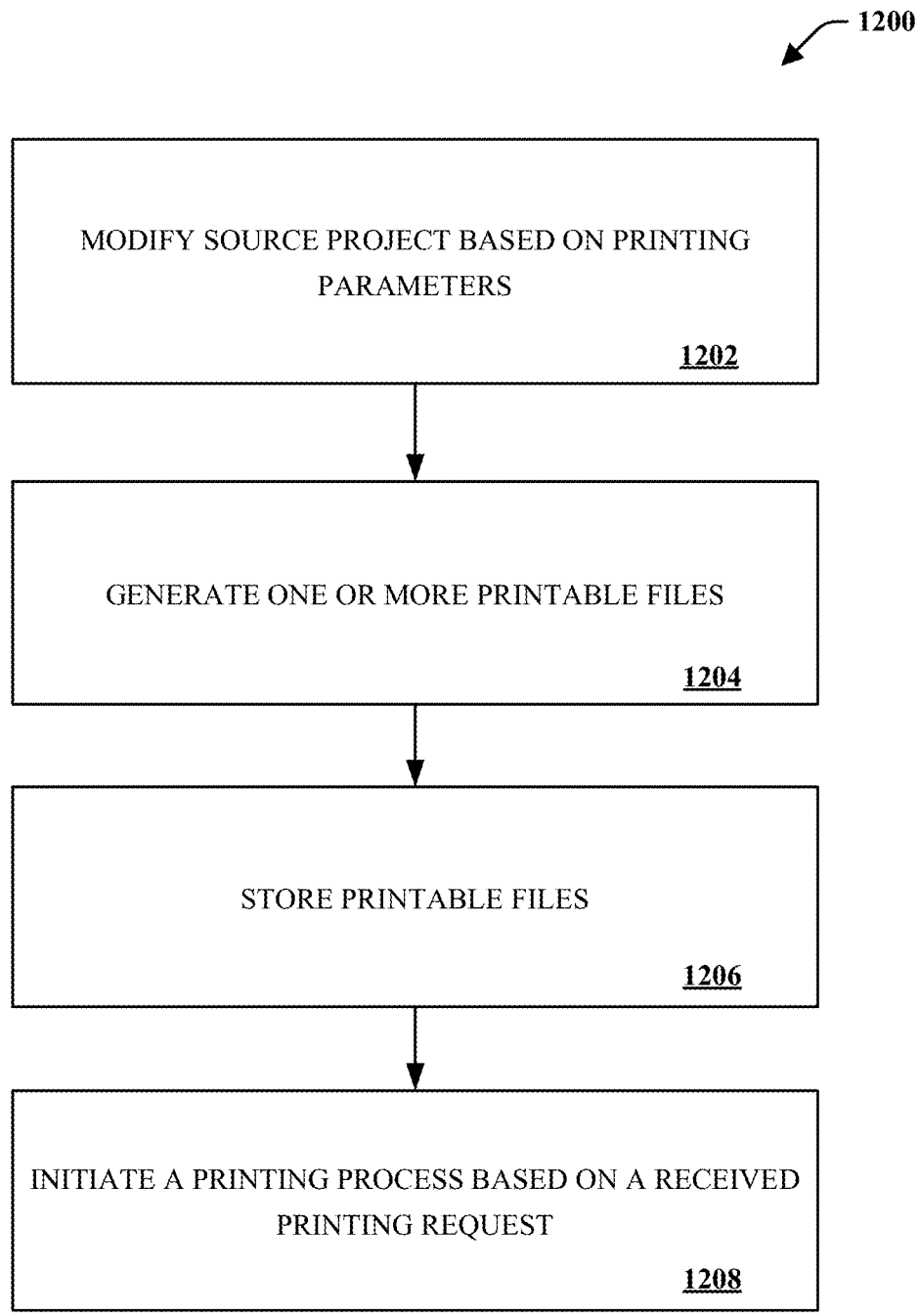
FIG. 12 is a flow diagram of an exemplary method associated with a printing system that may facilitate conversion of a project, in accordance with various described embodiments.

Turning to FIGS. 11-12, illustrated are exemplary methods according to various disclosed embodiments. For instance, FIG. 11 may comprise a design and printing method 1100 associated with a printing system (e.g., printing system 100). While the methods are shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the likes.

FIG. 11 depicts an exemplary flowchart of the method 1100 associated with a printing system, according to various aspects of the subject disclosure. As an example, method 1100 may finalize (e.g., generate) a project that may be converted based on selected parameters for printing the project.

At 1102, a system comprising a processor (e.g., printing system 100) may receive input for a project design. The input may include, for example, user input relating to visual design elements. In another aspect, the input may comprise information retrieved from a database (e.g., such as a stored project, image, or the like). In an example, a user may identify or capture (e.g., via a user device) an image to add (e.g., upload) to a project. It is noted that the input may comprise imagery, text, or other visual elements.

At 1104, the system may finalize the project. Finalizing the project may include saving the project, receiving an instruction to initiate printing of the project, publishing the project, receiving an instruction to initiate ordering of prints of the project, or the like. In at least one example, finalizing the project may include locking the project from further changes. For example, a user may be satisfied with a project and may decide to publish the design of the project for others to use. The system may finalize the design and may prevent further modification of the design. In at least one other embodiment, a finalized design may be edited upon receiving input and/or permission for editing.

At 1106, the system may receive input identifying selected print modes, print mediums and/or printer devices associated with the project. For instance, a user may provide input regarding a preferred method of printing (e.g., user printing, professional printing, etc.). In another aspect, the user may select a print medium (e.g., label sheet, card stock, etc.), printer device, or the like. It is noted that the input may be received from devices or other systems. For example, a user may select a print mode. Based on the selected print mode, the system may automatically determine available print mediums and/or printer devices, such as via information received from a database and/or by identifying available devices.

At 1108, the system may convert, as described herein, the project for printing according to the selected print mode(s), print medium(s), and/or printer device(s). Converting the project may include converting a design based on a template associated with a print medium or the like. In another aspect, the system converts the project without requiring the user to modify the project. In at least one embodiment, converting the project may include, for example, reformatting, based on the print-receptive medium, a customized design from a first format to a second format. Reformatting may include, reformatting the customized design for printing onto a target print medium (e.g., a selected print medium, etc.) based on converting the design from a first to a second template file.

FIG. 12 depicts an exemplary flowchart of a conversion and/or printing method 1200 associated with a printing system, according to various aspects of the subject disclosure. As an example, printing method 1200 may modify a source project and may generate one or more printable files. The printable files may be associated with particular parameters for printing (e.g., type of print-receptive medium, printer type, etc.).

At 1202, a system comprising a processor (e.g., printing system 100), may modify the source project based on printing parameters. In an example, the source project may comprise an originally design project. The originally designed project may have been designed for a particular print-receptive medium and/or printer device. For instance, a user may design a project to be printed via a desktop printer and to be printed on an 8½ in.×11 in. sheet of labels. The system may determine whether the project will be printed on a different sheet and/or via a different printer, such as on an 11 in.×17 in. sheet of labels printed via a commercial printer device, a business card to be printed on print stock, or the like. In an aspect, the system may determine parameters to be modified based on the different parameters and may modify the design based on the parameters. While the present teachings allow a user to use the same source project to print to multiple printable media products without modifying the source project, this does not mean the user cannot modify the overall design of the product. For example, the system or method of the present teachings may allow a user to design a business card and address label that include the same logo but have different text. For instance, the system may modify the source project and the user may provide additional modifications.

At 1204, the system may generate one or more printable files without a user having to re-create, modify, or reload the source project. For instance, the system can automatically create a second source file without user intervention. At 1206, the system may store printable files in a memory (e.g., memory 102, etc.). The printable file may be stored as an image file, a PDF file, a word processing file, a postscript file, a custom file format, or the like.

At 1208, the system may initiate a printing process based on a received printing request. The received printing request may be initiated in response to input received from a user. For instance, a user may enter information for printing, such as a quantity, a method of printing, payment information, delivery information, or the like. Once satisfied, the user may provide input to initiate printing. The system may transmit and/or process the print request based on the selected print parameters. In an aspect, the printing method may include printing via a user printer, a service provider printer (e.g., professional printing device, etc.) or the like. In an example, a professional printing device may automatically print a design upon receiving an order. In another example, an order may be reviewed by a service provider, and the service provider may then authorize printing.

Methods of the present teachings may further include the step of creating a printable file or a plurality of printable files and printing the printable file on a client-controlled printer. The printable file may need to accommodate mechanical characteristics of the particular client-controlled printer in the form of horizontal and vertical page position offsets. The offsets may be stored for each user for each kind of major paper size including, without limitation US Letter and A4 paper sizes. The offset value may be selected by an optional alignment procedure the customer may execute from within the program after creating any printable file. Thereafter the new offset value may be stored and the offset value automatically supplied to every subsequent printable file generated by the user until the user elects to modify the offset value. The printable item file may be a Portable Document Format (PDF) file, a Postscript file or another format known in the art or developed in the future.

Additionally, printable media products (e.g., customizable items) may take the form of software objects, which may generate strings of text describing the media products. The interactive project selection process presented to the client, therefore, may be presented as a series of transient HTML pages, readable within a Web browser and dynamically regenerated according to user input and the presence of media product objects and item templates on the server. Rather, systems and methods of the present teachings may use any of a number of descriptive files to represent products within a product line. Such files may be called "project objects," "product object files" or "SKU object files" and contain descriptive product data therein.

Figure 13:
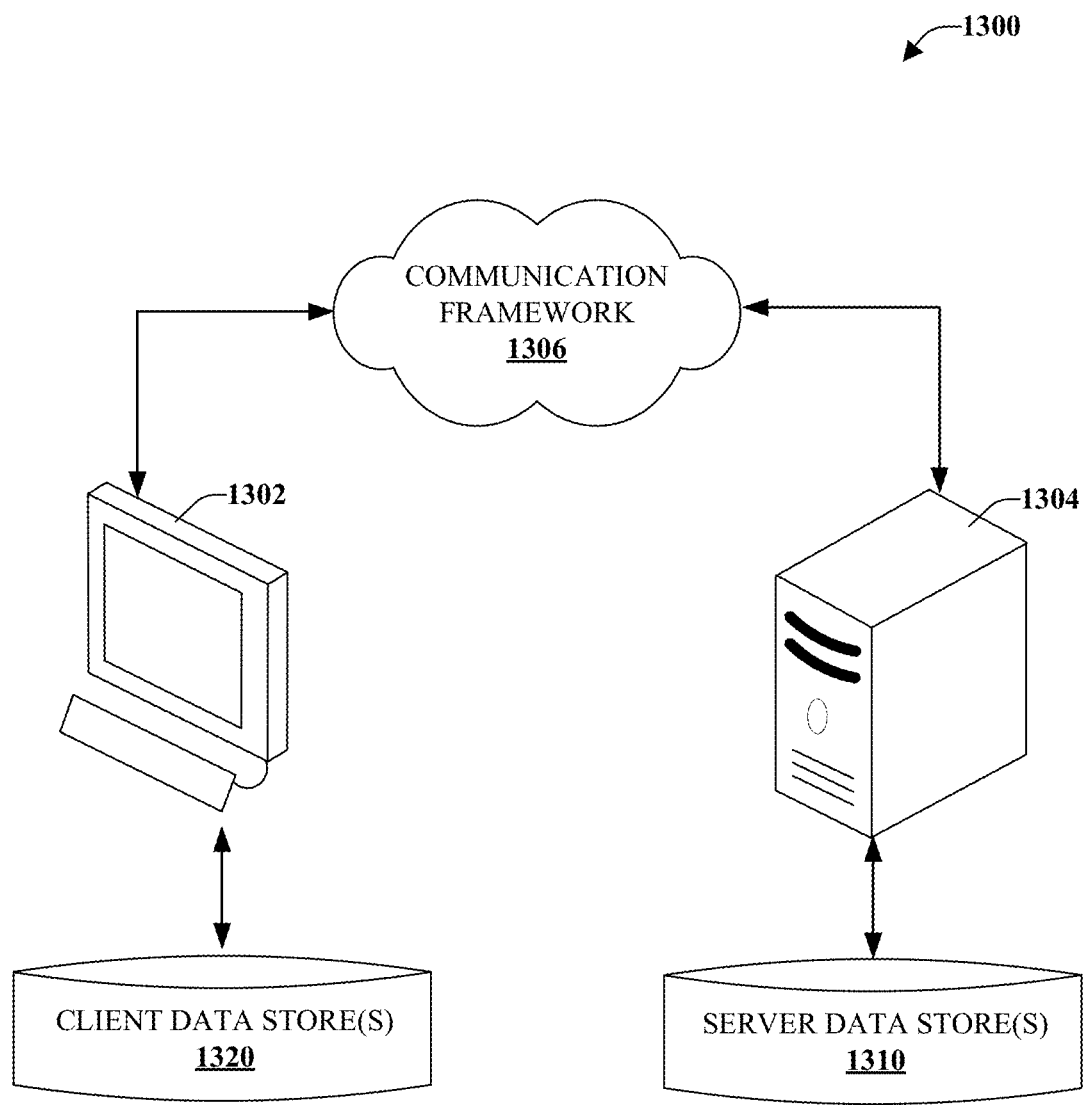
FIG. 13 is an environmental diagram of an exemplary communication system, in accordance with various embodiments disclosed herein.
Figure 14:
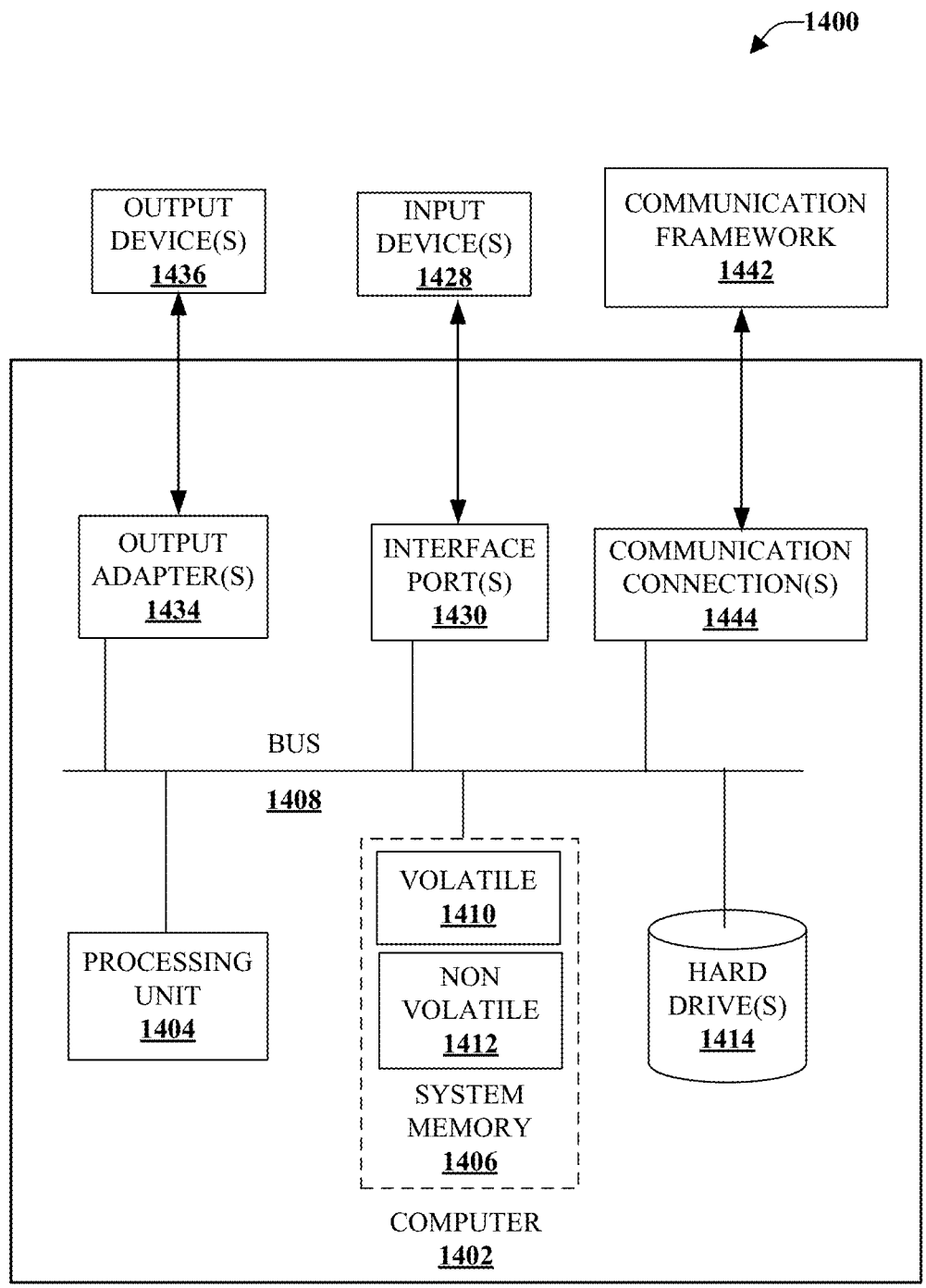
FIG. 14 is a block diagram of a functional computer system in accordance with various described embodiments.

What has been described above may be further understood with reference to the following figures. FIGS. 13 and 14 provide exemplary operating environments or systems capable of implementing one or more systems, apparatuses, or processes described above. FIGS. 13 and 14 are not intended to limit the scope of such systems, apparatuses, or processes. By way of example, computing environment 1300 may refer to one or more embodiment of the various embodiments described with reference to the above figures. However, variations to computing environment 1300 may be obvious to achieve aspects or processes described herein.

FIG. 13 is a schematic diagram of a computing environment 1300 in accordance with various disclosed aspects. It is noted that computing environment 1300 may include various other components or aspects. As depicted, computing environment 1300 may include one or more client(s) 1302, one or more server(s) 1304, one or more client data store(s) 1320, one or more server data store(s) 1310, and a communication framework 1306.

While depicted as a desktop computer(s), client(s) 1302 may include various other devices that may comprise hardware and/or software (e.g., program threads, processes, computer processors, non-transitory memory devices, etc.). In an example, client(s) 1302 may include laptop computers, smart phones, tablet computers, wearables, etc.). The client(s) 1302 may include or employ various aspects disclosed herein. For example, client(s) 1302 may include or employ all or part of various systems and processes disclosed herein.

Likewise, server(s) 1304 may include various devices that may comprise hardware and/or software (e.g., program threads, processes, computer processors, non-transitory memory devices, etc.). Server(s) 1304 may include or employ various aspects disclosed herein. For example, server(s) 1304 may include or employ all or part of various systems and processes disclosed herein. It is noted that server(s) 1304 and client(s) 1302 may communicate via communication framework 1306. In an exemplary communication, client(s) 1302 and server(s) 1304 may utilize packeted data (e.g., data packets) adapted to be transmitted between two or more computers. For instance, data packets may include coded information associated with printing requests, orders, available printers, parameters associated with print-receptive media, or the likes.

Communication framework 1306 may comprise various network devices (e.g., access points, routers, base stations, etc.) that may facilitate communication between client(s) 1302 and server(s) 1304. It is noted that various forms of communications may be utilized, such as wired (e.g., optical fiber, twisted copper wire, etc.) and/or wireless (e.g., cellular, Wi-Fi, NFC, etc.) communications.

In various embodiments, client(s) 1302 and server(s) 1304 may respectively include or communicate with one or more client data store(s) 1320 or one or more server data store(s) 1310. The data stores may store data local to client(s) 1302 or server(s) 1304.

In at least one embodiment, a client of client(s) 1302 may transfer data describing a print order, user account data, printer device data, or the likes to a server of server(s) 1304. The server may store the data and/or employ processes to alter the data. For example, the server may transmit the data to other clients of client(s) 1302.

FIG. 14 is a block diagram of a computer system 1400 that may be employed to execute various disclosed embodiments. It is noted that various components may be implemented in combination with computer executable instructions, hardware devices, and/or combinations of hardware and software devices that may be performed by computer 1400.

Computer 1400 may include various components, hardware devices, software, software in execution, and the like. In embodiments, computer 1400 may include computer 1400. Computer 1400 may include a system bus 1408 that couples various system components. Such components may include a processing unit(s) 1404, system memory device(s) 1406, disk storage device(s) 1414, sensor(s) 1435, output adapter(s) 1434, interface port(s) 1430, and communication connection(s) 1444. One or more of the various components may be employed to perform aspects or embodiments disclosed herein. In an aspect, the computer system 1400 may "learn," such as described above user preferences based upon modifications of designs, feedback associated with satisfaction, or the like. For example, the computer 1400 may modify a particular conversion process (or a set thereof) as a number of users have disapproved of the conversions (e.g., from a particular format to another format). The computer 1400 may dynamically push the revised conversion process or receive the revised conversion process as applicable.

Processing unit(s) 1404 may comprise various hardware processing devices, such as single-core or multi-core processing devices. Moreover, processing unit(s) 1404 may refer to a "processor," "controller," "computing processing unit (CPU)," or the likes. Such terms generally relate to a hardware device. Additionally, processing unit(s) 1404 may include an integrated circuit, an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or the like.

System memory 1406 may include one or more types of memory, such volatile memory 1410 (e.g., random access memory (RAM)) and non-volatile memory 1412 (e.g., read-only memory (ROM)). ROM may include erasable programmable ROM (EPROM), electrically erasable programmable ROM (EEPROM). In various embodiments, processing unit(s) 1404 may execute computer executable instructions stored in system memory 1406, such as operating system instructions and the likes.

Computer 1402 may also be one or more hard drive(s) 1414 (e.g., EIDE, SATA). While hard drive(s) 1414 are depicted as internal to computer 1402, it is noted that hard drive(s) 1414 may be external and/or coupled to computer 1402 via remote connections. Moreover, input port(s) 1430 may include interfaces for coupling to input device(s) 1428, such as disk drives. Disk drives may include components configured to receive, read and/or write to various types of memory devices, such as magnetic disks, optical disks (e.g., compact disks and/or other optical media), flash memory, zip drives, magnetic tapes, and the likes.

It is noted that hard drive(s) 1414 and/or other disk drives (or non-transitory memory devices in general) may store data and/or computer-executable instructions according to various described embodiments. Such memory devices may also include computer-executable instructions associated with various other programs or modules. For instance, hard drives(s) 1414 may include operating system modules, application program modules, and the likes. Moreover, disclosed aspects are not limited to a particular operating system, such as a commercially available operating system.

Input device(s) 1428 may also include various user interface devices or other input devices, such as sensors (e.g., microphones, pressure sensors, light sensors, etc.), scales, cameras, scanners, facsimile machines, and the likes. A user interface device may generate instructions associated with user commands. Such instructions may be received by computer 1402. Examples of such interface devices include a keyboard, mouse (e.g., pointing device), joystick, remote controller, gaming controller, touch screen, stylus, and the likes. Input port(s) 1430 may provide connections for the input device(s) 1428, such as via universal serial ports USB ports), infrared (IR) sensors, serial ports, parallel ports, wireless connections, specialized ports, and the likes.

Output adapter(s) 1434 may include various devices and/or programs that interface with output device(s) 1436. Such output device(s) 1436 may include LEDs, computer monitors, touch screens, televisions, projectors, audio devices, printing devices, or the likes.

In embodiments, computer 1402 may be utilized as a client and/or a server device. As such, computer 1402 may include communication connection(s) 1444 for connecting to a communication framework 1442. Communication connection(s) 1444 may include devices or components capable of connecting to a network. For instance, communication connection(s) 1444 may include cellular antennas, wireless antennas, wired connections, and the likes. Such communication connection(s) 1444 may connect to networks via communication framework 1442. The networks may include wide area networks, local area networks, facility or enterprise wide networks (e.g., intranet), global networks (e.g., Internet), satellite networks, and the likes. Some examples of wireless networks include Wi-Fi, Wi-Fi direct, BLUETOOTH™, Zigbee, and other 802.XX wireless technologies. It is noted that communication framework 1442 may include multiple networks connected together. For instance, a Wi-Fi network may be connected to a wired Ethernet network.

The terms "component," "module," "system," "interface," "platform," "service," "framework," "connector," "controller," or the like are generally intended to refer to a computer-related entity. Such terms may refer to at least one of hardware, software, or software in execution. For example, a component may include a computer process running on a processor, a processor, a device, a process, a computer thread, or the likes. In another aspect, such terms may include both an application running on a processor and a processor. Moreover, such terms may be localized to one computer and/or may be distributed across multiple computers.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define the described systems. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing descriptions of exemplary embodiments of the present teachings have been presented for purposes of enablement, illustration, and description. They are not intended to be exhaustive of or to limit the present disclosure to the precise forms discussed. Many modifications and variations of the present disclosure are possible in light of the above teachings. Completed customization projects may be printed either remotely, such as at a factory remote from the user's location, or locally, such as at the user's personal printer. Also, the present disclosure is not limited to use across the Internet. Rather, the disclosure may be utilized over any computer communications network, including an internal, secure network. Further, although one feature of the disclosure is to enable customization of products without requiring a user to download software for performing the customization, it is anticipated that systems of the present disclosure may be employed and practiced on a local machine, without communicating across a network.

What is claimed is:

1. A method for customizing a printing operation, the method comprising:
   receiving, by a system including a processor, data associated with user input for a design project;
   generating, by the system, a first printable file comprising the design, wherein the first printable file is associated with a determined print medium;
   identifying a target print medium selected for having the design printed thereon;
   determining, by the system, whether the first printable file is operable for the target print medium based on comparison of the target print medium and the determined print medium; and
   in response to determining that the first printable file is not operable for the target print medium, automatically reformatting the design in the first printable file without user intervention for printing onto the target print medium by modifying design according to a template associated with the target print medium.

2. The method of claim 1, wherein receiving the data associated with the user input, further comprises receiving at least one of custom image data or custom text data.

3. The method of claim 1, wherein reformatting the design further comprises generating a second printable file comprising the design and configured for printing on the target print medium.

4. The method of claim 1, wherein reformatting the design further comprises reformatting the design without receiving user input associated with modifying the design.

5. The method of claim 1, wherein the target print medium is identified as comprising at least one of an 8½ inch×11 inch sheet of print mediums, a 12 inch×18 inch sheet of print mediums, or a rolled sheet of print mediums.

6. The method of claim 1, wherein the operations further comprise:
   in response to receiving input requesting professional printing of the design, initiating transmission of the design and information associated with the request to a device associated with the professional printing service.

7. The method of claim 1, wherein the operations further comprise:
   in response to receiving the data associated with user input for a design project, determining whether the design is within parameters of the determined print medium.

8. The method of claim 1, wherein modifying the design further comprises repositioning visual elements according to the template.

9. The method of claim 1, further comprising, initiating printing of the design and delivery of printed products by a service provider.

10. A printing system, comprising:
a processor coupled to a memory storing computer-executable instructions, the processor executes or facilitates execution of the computer-executable instructions to perform operations comprising:
identifying a user-generated design arranged in a first template associated with a first type of print-receptive medium, the user-generated design having multiple visual elements;
initiating, based on user input, printing of the design to a second type of print-receptive medium based on a second template, wherein the first template and the second template comprise different parameters;
automatically repositioning and resizing the multiple visual elements according to the second template, wherein the second template defines locations, absolute positons, and print boundaries for each of the multiple visual elements,
wherein the first template is associated with a first label sheet, the second template is associated with a second label sheet, and the first label sheet comprises a different number of labels as the second label sheet; and
creating and storing a first printable file based on the first template format and a second printable file based on the second template format.

11. The printing system of claim 10, wherein the operations further comprise:
storing, in a memory device, a first printable file associated with the design arranged in the first template; and
storing, in the memory device, a second printable file associated with the design arranged in the second template.

12. The printing system of claim 10, wherein the operations further comprise storing at least one of the first printable file or the second printable file comprises at least one of a portable document format file or a postscript file.

13. The printing system of claim 10, wherein the operations further comprise:
transmitting an instruction to print the design to a professional printing service.

14. The printing system of claim 10, further comprising, initiating printing of the design and delivery of printed products by a service provider.

* * * * *